(12) United States Patent
Even et al.

(10) Patent No.: US 7,126,245 B2
(45) Date of Patent: Oct. 24, 2006

(54) POLYPHASE ARMATURE FOR A ROTARY ELECTRICAL MACHINE, AND ITS METHOD OF MANUFACTURE

(75) Inventors: Denis Even, Paris (FR); Patrick Rondier, Montmagny (FR); Paul Armiroli, Marolles en Brie (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 11/090,891

(22) Filed: Mar. 25, 2005

(65) Prior Publication Data
US 2005/0248229 A1 Nov. 10, 2005

(30) Foreign Application Priority Data
Mar. 31, 2004 (FR) ................... 04 03351

(51) Int. Cl.
*H02K 1/00* (2006.01)
(52) U.S. Cl. ............... 310/179; 310/184; 310/254
(58) Field of Classification Search .......... 310/179, 310/184, 201–208, 254, 260
See application file for complete search history.

(56) References Cited
U.S. PATENT DOCUMENTS

| | | | | |
|---|---|---|---|---|
| 3,476,964 A | * | 11/1969 | Willyoung | 310/198 |
| 3,631,278 A | * | 12/1971 | Snively | 310/158 |
| 4,309,634 A | * | 1/1982 | Koroly et al. | 310/201 |
| 6,469,413 B1 | * | 10/2002 | Oohashi et al. | 310/184 |
| 6,501,205 B1 | * | 12/2002 | Asao et al. | 310/184 |
| 6,515,392 B1 | * | 2/2003 | Ooiwa | 310/179 |
| 2002/0011753 A1 | * | 1/2002 | Asao et al. | 310/45 |
| 2004/0108784 A1 | * | 6/2004 | Higashino et al. | 310/179 |

* cited by examiner

*Primary Examiner*—Thanh Lam
(74) *Attorney, Agent, or Firm*—Berenato, White & Stavish

(57) ABSTRACT

The invention provides a polyphase armature (13) for a rotary electrical machine, comprising a body (14) carrying a plurality of phases (20 to 25), each of which comprises, firstly, an input (E1 to E'3) and an output (S1 to S'3), each of which is part of an electrically conductive input element and output element respectively, and, secondly, electrically conductive elements (37) for connecting the input of a phase to the output of a phase and constituting a winding having at least two coils per phase, together with at least one first electrically conductive inversion element (38, 338) for reversing the circumferential direction of the current in the winding, the said first inversion element being interposed electrically between the two coils, at least one phase winding being provided with at least one electrically conductive second inversion element (138, 238) for reversing the circumferential direction of the current in the said phase winding, and the electrically conductive output element of the said winding being connected in the electrical circuit that includes the two coils and the two electrically conductive inversion elements.

The invention also provides a method of making such an armature.

Application: a stator for a motor vehicle alternator.

28 Claims, 10 Drawing Sheets

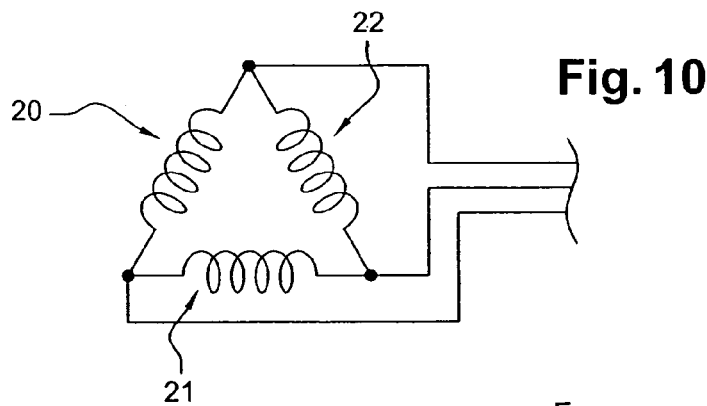
Fig. 10
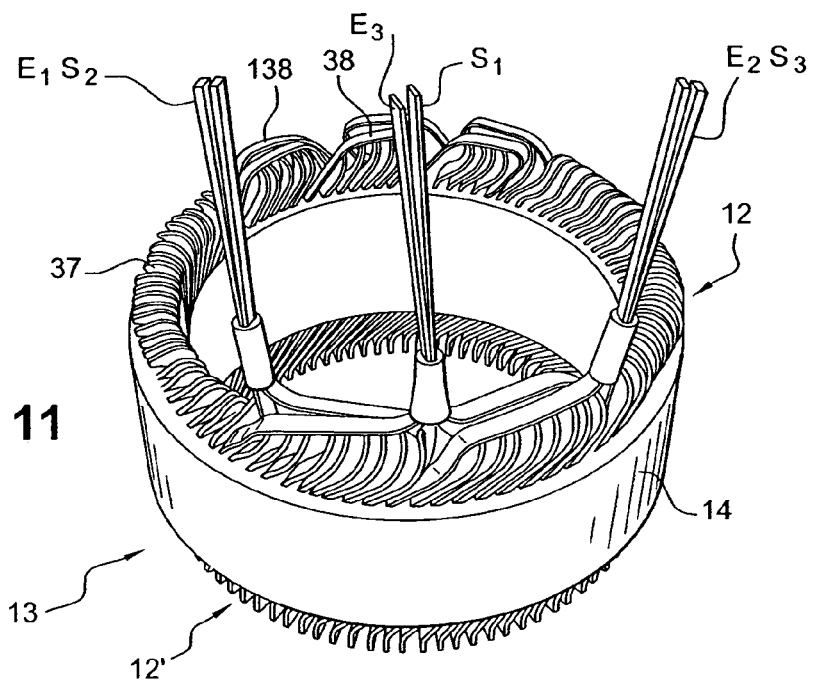
Fig. 11
Fig. 12
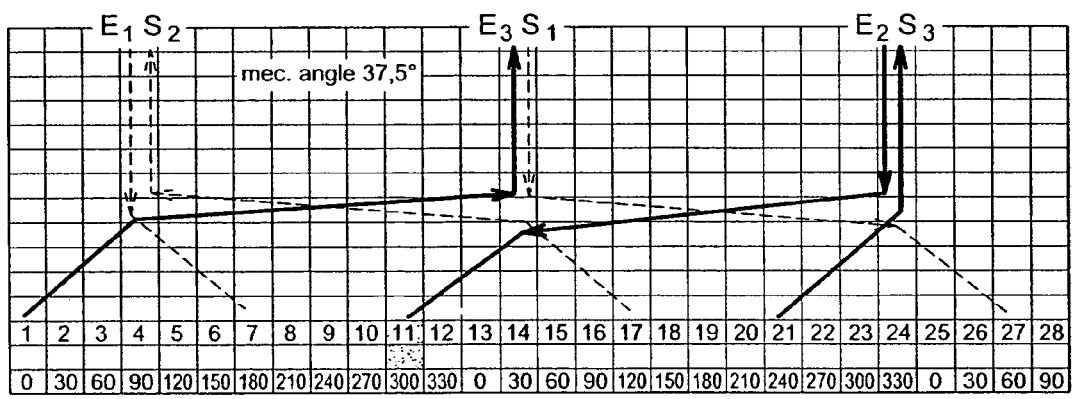

POLYPHASE ARMATURE FOR A ROTARY ELECTRICAL MACHINE, AND ITS METHOD OF MANUFACTURE

FIELD OF THE INVENTION

The present invention relates to a polyphase armature for a rotary electrical machine, in particular an alternator for motor vehicles, and a method of making it.

STATE OF THE ART

A polyphase armature of the above kind for a rotary electrical machine, such as a motor vehicle alternator, is described in the document WO92/06527.

This armature, which consists in this case of a stator, comprises a body having a plurality of phases, each of which comprises, firstly, an input and an output which are arranged on the outside of the body of the armature, and secondly, electrically conductive elements which are arranged in networks on either side of the body of the armature so as to constitute a first chignon and a second chignon, and which extend through the said body. These conductive elements are joined together so as to form the networks and so as to connect the input to the output of a phase, by forming a winding which includes at least two coils per phase with an electrically conductive inversion element which is interposed electrically between the two coils.

This inversion conductor enables the direction of the electric current flowing in the winding to be reversed.

The electrical machine may be reversible so as to constitute an alternator-starter, with a view in particular to starting the engine of a motor vehicle.

In another version, the armature is a rotor, and as described in the document WO02/069472, the rotary electrical machine is an alternator, the rotor of which is designed to supply power to the windings of an electromagnetic retarder for a motor vehicle.

The electrically conductive elements, in one embodiment, consist of electric wires.

In the two documents mentioned above, the conductive elements consist of bars, in particular in the form of hairpins of the standard type which are also referred to as generic hairpins and which are generally U-shaped, with the ends of the branches of the U being joined together in series by welding in a repeated pattern so as to form the networks. The body of the armature consists of a stack of laminations, each formed with slots which, after the laminations have been lined up in a stack, constitute a plurality of grooves. In the document WO92/06527 four branches of hairpins are provided in each slot, distributed radially in two layers.

The phase windings in the said document also comprise specific bars, namely hairpins for inversion and for intermediate connection, which are generally U-shaped with two branches joined by a head, together with specific output and input hairpins which carry the outputs and inputs respectively of the phase windings (see references 20, 19 and 21 and FIGS. 2 and 3 in the said document WO92/06527).

Each of the hairpins has at least one branch which is carried by the body and the stator, and which extends through the slots and therefore the grooves in the stack of laminations. These hairpins project axially on either side of the body of the stator so as to constitute the first and second chignons.

The branches of the standard type hairpins and the hairpins for intermediate connection are offset circumferentially with respect to each other and mounted in slots which are separated by one pole pitch, with one of the branches being disposed in a lower layer of one of the slots while the other branch is arranged in an upper layer of the other one of these slots.

The specific inversion hairpins enable the circumferential direction of the electric current flowing in a phase winding to be reversed (see the arrows in FIG. 2 of the document WO92/06527). They have branches which are separated by one pole pitch and each of these branches is arranged in the upper layer of the slots concerned. These hairpins partly straddle the heads of adjacent hairpins belonging to other phases, and they are interleaved electrically between two coils of one common phase winding.

The heads of the inversion hairpins, the standard type hairpins and those for intermediate connection between a first and a second coil comprise two connecting arms which are inclined and extend on either side of a summit portion. The inclined arms extend the length of the branches of these hairpins.

Each head of an inversion hairpin connects a terminal or output branch of the second coil to the input branch of a third coil.

The arms of the heads of the inversion hairpins are inclined circumferentially in the same direction, while the arms of the heads of the standard type hairpins and the intermediate liaison hairpins are inclined in opposite directions.

The welded ends of the hairpins, constituting the feet of the latter and making a repeated elementary pattern, are part of one of the chignons, while the inputs and outputs of the phase windings, comprising a plurality of coils connected in series, are part of the other chignon.

In the document FR-A-2 818 822, the inversion hairpins are also provided, and the coils of the phases are star connected, with the inputs of the phases being connected to a neutral point, while the outputs of the phases are adapted to be connected to a rectifying device, which is included in the alternator, for rectifying alternating to unidirectional current.

This arrangement does give satisfaction, because the inputs are simplified due to the fact that there is no need to extend the length of the latter to connect them to a common neutral point; this connection is simply and cheaply achieved by an electrical connection.

With reference to FIG. 1, it is found that the electrical connection part 50 is arranged above the two outputs S2 and S3, which are themselves located above the inversion hairpins 38, in the form of a bridge partly straddling five, in this example, adjacent heads of hairpins in other phases. The branches of these hairpins 38 in this case occupy the lower layers of the slots concerned.

In the two documents mentioned above, there is some lack of flexibility as regards the location of the outputs.

OBJECT OF THE INVENTION

The object of the present invention is to overcome this disadvantage in a simple manner.

According to the invention, a method of making a polyphase armature for a rotary electric machine, of the type described above in which each phase has a winding which includes at least two coils, together with a first electrically conductive inversion element for reversing the circumferential direction of the current in the winding, the first inversion element being interposed electrically between the two coils, is characterised in that the electrically conductive input and output elements of a common phase, referred to as the first phase, are connected together to constitute a second electrically conductive inversion element for reversing the circumferential direction of the current, and in that the electrically conductive output element of that winding is connected in the electrical circuit comprising the two coils and the two inversion elements.

With reference to the document WO92/06527, starting from an arrangement in which the electrically conductive input and output elements are adjacent (or close) to the first inversion element, these conductive elements are connected together in the manner described above. It is then possible to fit the input and the output easily.

Preferably, in order to avoid a great local concentration of specific conductive elements, circumferentially spaced away from the electrically conductive inversion elements, an electrically conductive element is put in position to form at least the output of the said first phase.

An armature of the type described above is characterised in that at least one phase winding is provided with at least one electrically conductive second inversion element for reversing the circumferential direction of the current, and in that the electrically conductive output element is connected in the electrical circuit that includes the two coils and the two electrically conductive inversion elements.

In one embodiment, the electrically conductive elements consist of bars, and the coils comprise hairpins of the standard type which are connected through specific bars in the form of inversion hairpins to form first and second electrically conductive inversion elements.

These hairpins comprise, firstly, two branches which are spaced apart circumferentially from each other, and secondly, a head which joins these two branches together.

The heads of the hairpins are part of the same chignon in one embodiment.

Thanks to the invention, the inputs and outputs can be put in any appropriate place, and the chignons are of reduced size, which enables the resistance of the phase windings, and therefore losses by Joule effect, to be reduced.

The output of the rotary electrical machine is increased, and the amount of fluctuation is reduced due to the fact that more regular distribution of the various hairpins is able to be obtained. Magnetic noise is accordingly reduced.

The armature body slots are well filled.

Preferably, the head of the second inversion hairpin is mounted in the vicinity of the head of the first inversion hairpin on a circumference having a diameter different from that of the first inversion hairpin.

This arrangement facilitates the process of winding the phase windings.

Preferably, the inputs and outputs are offset circumferentially with respect to the inversion hairpins, so that interference between the specific hairpins and therefore the risks of short circuit are reduced still further.

An improved passage for air in the region of the chignon concerned is thus obtained. The rotary electrical machine is thus more powerful and better cooled.

In addition, the electrically conductive hairpins can be stripped bare at least in the region of the chignon carrying the inputs and/or the outputs of the phases, due to the fact that interference is reduced.

Cooling of the rotary electrical machine is thereby improved even more.

In one embodiment, each phase includes hairpins of standard type which are generally U-shaped, at least two inversion hairpins which are generally U-shaped with heads having a flattened summit portion, and input and output hairpins.

The form of the said inversion hairpins depends on the application. In a modified version, the summit portion of the inversion hairpins is of rounded form.

The heads of the inversion hairpins are initially made wider circumferentially than those of the standard type prior to the twisting of the latter.

Thanks to the invention, numerous types of connections and/or arrangements of the phase windings can be obtained.

Thus, the inputs and outputs of the phases can be easily connected either in star formation or in delta formation.

In one embodiment, the phase windings are connected in series, but in another embodiment they are connected in parallel.

As described in the document U.S. Pat. No. 4,163,187, the alternator may have first windings which are star connected and second windings which are either delta connected or star connected.

In one embodiment, the electrically conductive elements consist of bars, which extend through slots formed in the body of the armature. In that case, preferably, and with reference to the document WO92/06527, the number of slots in the body of the armature is doubled so as to give the greatest possible latitude for the circumferential location of the inputs and outputs of the phases with respect to the inversion hairpins, of which there can therefore be many, for example four per phase.

Moreover, this enables two electrically conductive bars to be easily fitted in each slot. Manufacture of the electrical machine is thus simplified.

In another embodiment, the bars extend through the body of the armature and the latter does not have any slots. In this case, with the aid of electrically insulating material such as resin, the bars are fixed in two layers within the body of the armature in the manner described for example in the document U.S. Pat. No. 5,097,167, so that a secondary body is created with closed slots. The secondary body is attached in the body of the armature and fastened, in this case by adhesive bonding.

In a modified version, the slots are formed in a component which is attached by being fastened inside the body of the armature.

In all cases, the slots are therefore carried by the armature body.

In one embodiment, the branches of the bars are preferably mounted one above the other in layers, the branches of the inversion hairpins occupying the same layers while the bars of the standard type hairpins occupy different layers.

The branches of the first inversion hairpins are mounted for example in the lower layers, while the branches of the second inversion hairpins are mounted in the upper layers. The opposite is possible.

There are therefore a plurality of pairs which are arranged in a circumferential row.

In a modified version, the standard type hairpins are in the form of a paperclip, and accordingly have four branches.

BRIEF DESCRIPTION OF THE DRAWINGS

The following description illustrates the invention with reference to the attached drawings, in which:

FIGS. 10 to 12 are views similar to FIGS. 7 to 9, and illustrate a fourth embodiment of the invention;

DESCRIPTION OF PREFERRED EMBODIMENTS OF THE INVENTION

Figure 1:
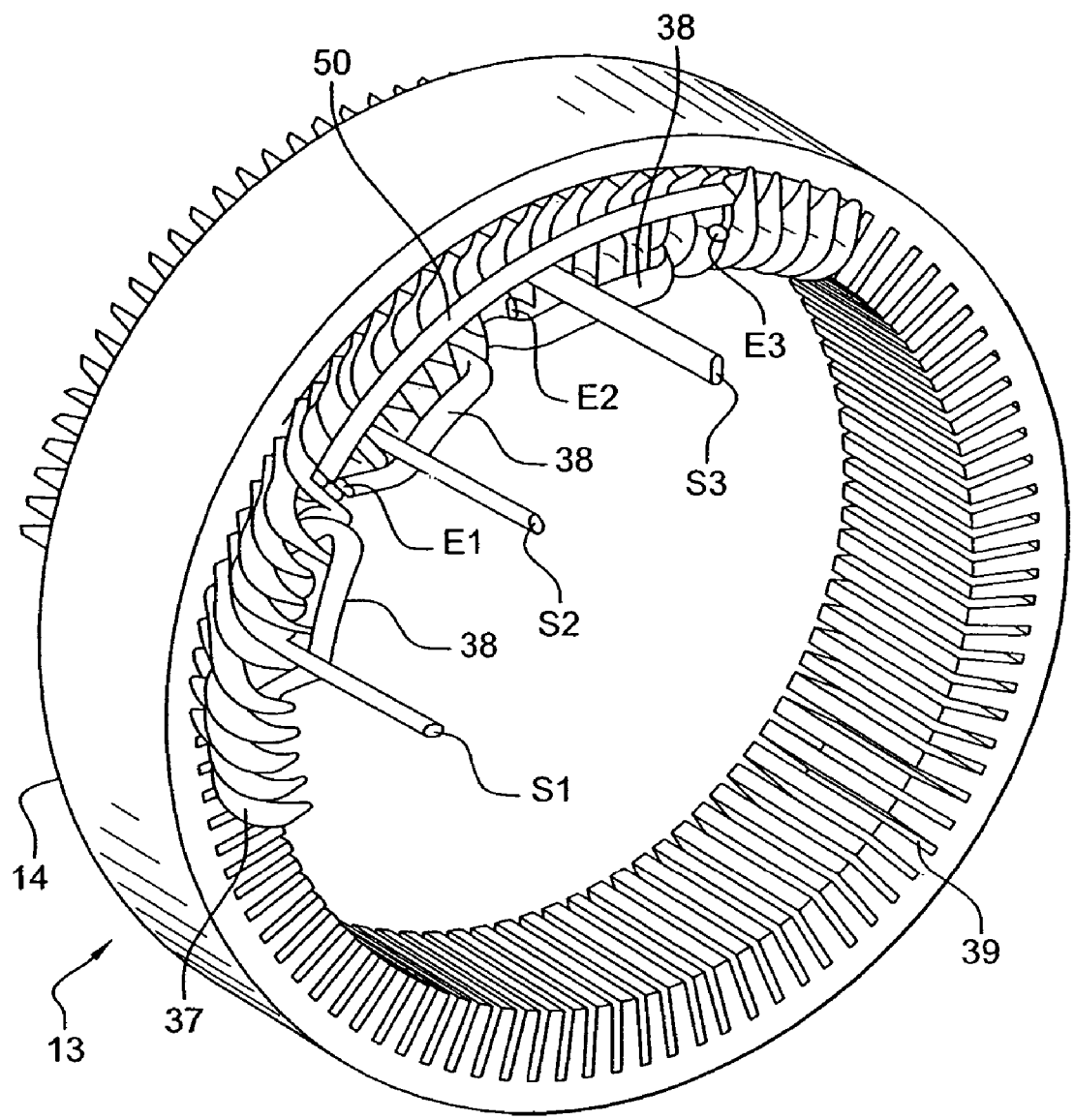
FIG. 1 is a perspective view of the stator, identical to that shown in FIG. 2 of the document FR-A-2 818 822, with electrically conductive elements removed in order to show the slots in the stator.

In the drawings, those elements which are identical or similar to each other will be given the same reference signs. In the diagrams of FIGS. 9 and 12 to 20, the electrically conductive bars which occupy an upper layer in a slot are shown, in the conventional way, in full lines while the bars which occupy a lower layer or an internal layer of a slot are shown in broken lines.

Figure 2:
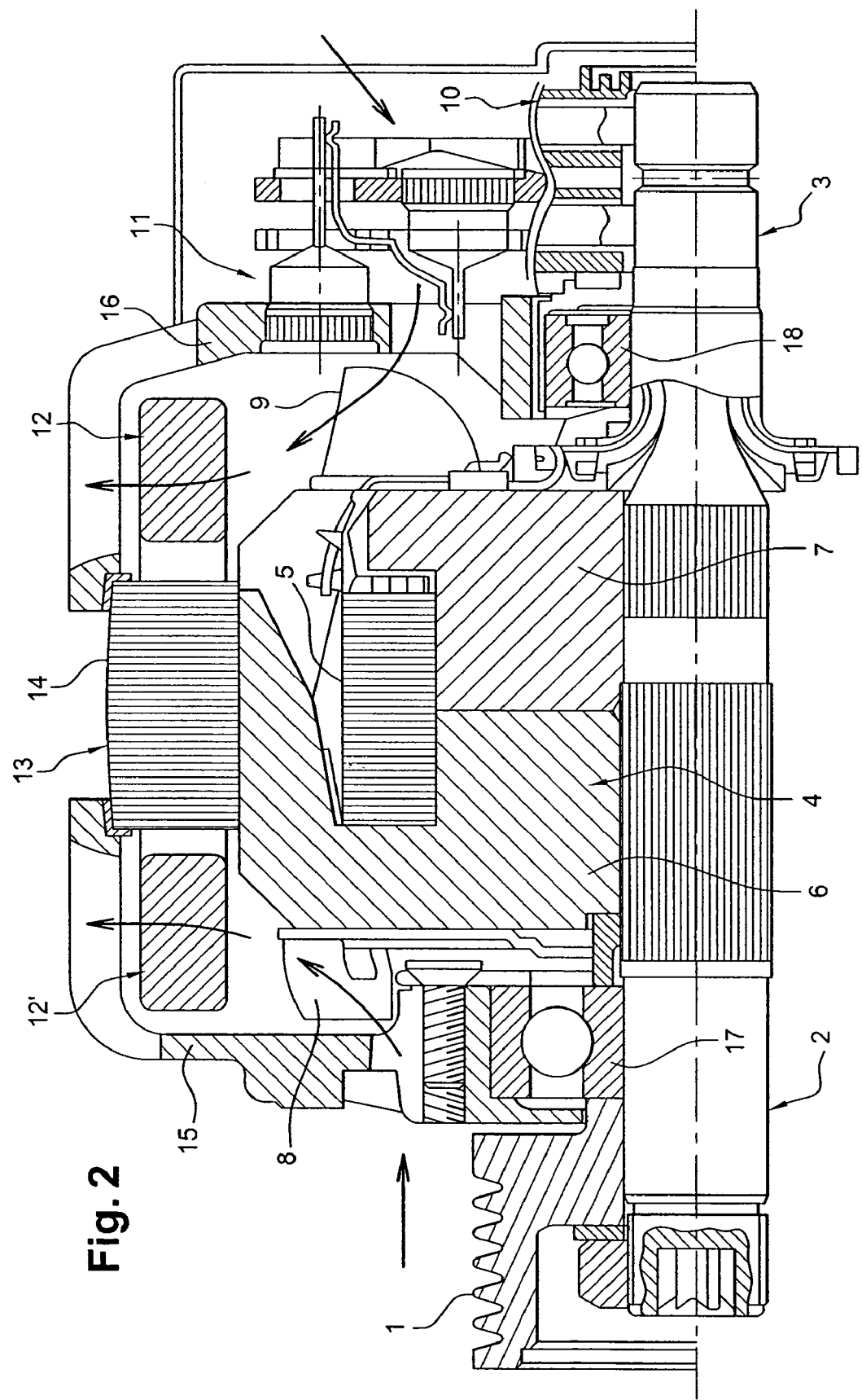
FIG. 2 is a half view of an alternator in axial cross section, with the stator, equipped with windings according to the invention, being shown diagrammatically.

FIG. 2 shows a polyphase rotary electrical machine in the form of a compact alternator with internal ventilation, being of the three phase type for a motor vehicle with a heat engine. The alternator has two bearing plates 15 and 16, constituting a casing for mounting of an armature stator 13 and an inductor rotor 4 inside the casing.

The alternator has, going from left to right in FIG. 2, a driving member in the form of a pulley 1 which is fixed, in this example by means of a nut, to the front end of a shaft 2, the rear end of which carries slip rings (not given reference numerals) of a collector 3.

The slip rings are connected through wire connections to the ends of an excitation winding 5 of the rotor 4, fixed to the central portion of the shaft 2, the axis of which is the axis of rotation of the alternator. In this example, the rotor 4 is a claw-type rotor, which comprises two pole wheels, namely a front pole wheel and a rear pole wheel, each of which carries a fan, namely a front fan 8 and rear fan 9, to increase the power of the alternator and reduce noise. Each pole wheel comprises a radial plate 6, 7 at right angles to the shaft 2 and having knurled portions (not given reference numerals) for fastening of the said radial plate portions.

The fans 8 and 9 comprise a first set of blades or vanes which define ventilation channels between them. Two sets of blades are preferably provided, with different lengths as described in the document FR-A-2 811 156, so that at least one blade of the second set of blades is interleaved between two consecutive longer blades of the first set of blades, in order to reduce the noise from the alternator while improving its ventilation. The blades are formed so as to project, by stamping and bending, or in another version by in situ moulding of a fixed radial plate, for example by welding or any other means such as seaming, on the radial plate of the pole wheel concerned.

The excitation winding 5 is mounted around a core which is fitted axially between the radial plate portions 6 and 7. In another version, as shown in FIG. 2, the core is replaced by two half cores, each of which is integral with the radial plate portion 6 or 7 concerned.

Axially extending teeth are formed integrally at the outer periphery of the radial plate portions 6 and 7. The teeth have a trapezoidal form and in this example each tooth has at least one noise reducing chamfer formed laterally in the region of its root zone where it joins the radial plate portion of the pole wheel concerned, in order to reduce noise from the alternator, especially magnetic noise, even more. Preferably each tooth has two anti-noise chamfers with respect to an axial axis of symmetry. For more details, reference should be made to the document EP-A-0 515 259.

The teeth of one of the pole wheels are directed towards the other pole wheel, being offset angularly with respect to the teeth of that other wheel. The teeth are therefore interleaved with each other in such a way that, in a modified embodiment, permanent magnets are interposed between the teeth in order to increase even further the power from the machine. For example, profiled grooves are formed in the side edges of the teeth in order to receive permanent magnets interposed as described in the document FR-A-2 793 085.

The winding 5 is energised, that is to say it is supplied with electrical power, through the slip rings of the collector 3, each of which is in contact with a brush (not given a reference numeral) which is carried by a brush carrier 10 that also serves to support a voltage regulator, which cannot be seen in the drawing but which is connected electrically to the brushes for regulating the voltage in the winding 5.

Thus, when the winding 5 is energised, the rotor 4 is magnetised and in this way magnetic pole pairs are created, each pole wheel accordingly including, respectively, P/2 north poles and P/2 south poles. During rotation of the rotor, an induced current is set up in the windings carried by the body 14.

More precisely, the stator 13, which in this case constitutes the armature of the rotary electrical machine, has a body 14, in the form of a stack of laminations for reduction of Foucault currents, and the body has internal slots 39 (see FIGS. 1 and 3) for containing electrically conductive elements, which in this example consist of conductive bars in the form of hairpins, these being part of phase windings which will be described later herein. The outputs of these windings are connected to a rectifying device 11 for converting alternating current to direct current, for example a diode bridge (two of the diodes of which can be seen in FIG. 2).

In this example, the bridge is of the same type as that which is described in the document EP-A-0 743 738, and accordingly it comprises a positive heat dissipator on which the positive diodes are mounted, a negative heat dissipator on which are mounted the negative diodes, and a collector. In this example the negative dissipator consists of the radial plate portion of the rear bearing plate 16 which is described later herein.

In another version, the bridge is of the same type as that described in the document FR-A-2 827 437. In that case, the positive dissipator includes cooling fins, which extend in the radial direction of the alternator; the negative diodes carried by the rear bearing are cooled by convection and conduction. This type of bridge is well adapted for a high-power alternator, which is well ventilated thanks to the features of the invention to be described later herein.

Figure 3:
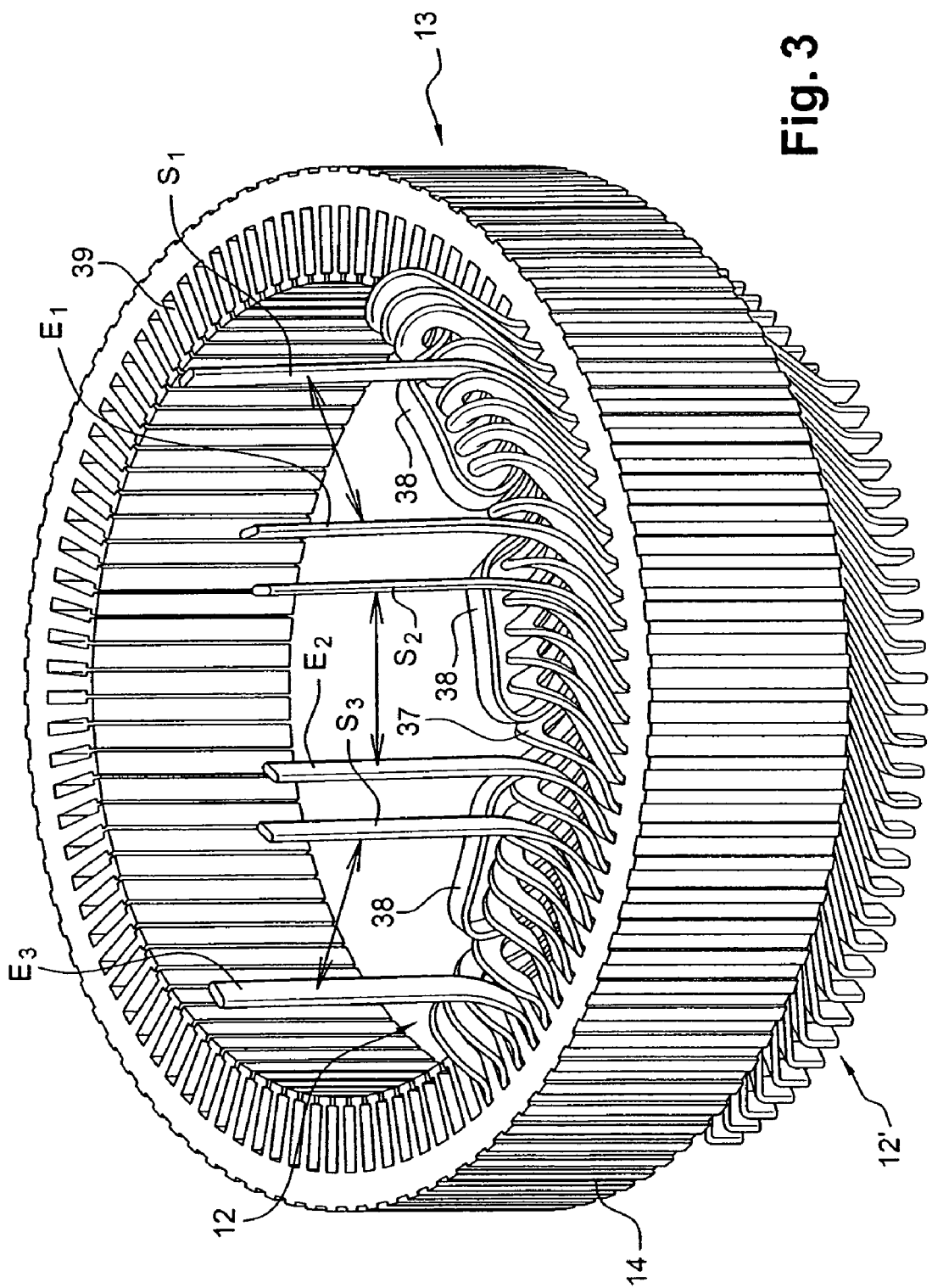
FIG. 3 is a perspective view of the stator of FIG. 2, before a second inversion hairpin according to the invention has been formed, and with electrically conductive elements removed in order to show the slots in the stack of laminations that constitute the body of the stator.

The body 14 is of tubular form, and has a cylindrical central aperture defining the inner periphery of the body 14 (see FIG. 3).

The slots 39, which in this example are radially of oblong form, constitute a plurality of grooves when the laminations of the body 14 are aligned with each other. In another version, the outer periphery of the body is not cylindrical, but is for example in the form of a barrel.

The said slots 39 are spaced apart circumferentially at regular intervals in the body 14, and are oriented radially. In another version, the slots are inclined with respect to the radial direction. These slots extend through the body 14.

The slots 39 in this case are of the semi-closed type, and have a generally rectangular cross section. Accordingly, each slot has a mouth which is open at the inner periphery of the body 14, in the cylindrical central aperture of the latter, and a base which is close to the outer periphery of the body 14, with a band of material, known as a yoke, between the base and the outer periphery of the body 14, which in this case is of cylindrical form. In a modified version, the outer periphery of the body 14 is not of cylindrical form.

A slot insulator is interposed between the edges of the slots 39 and the conductive hairpins. Such an insulator can be seen for example in FIG. 4 of the documents EP-A-0 881 752 and EP-A-0 967 709.

By its central aperture which in this case is cylindrical, the body 14 surrounds the rotor 4, with an air gap being defined between the inner periphery of the body 14 and the outer periphery of the rotor 4.

Each phase of the alternator includes a winding which has at least two coils arranged to form chignons 12 and 12', which project axially on either side of the body 14.

The coils are arranged in networks, in a manner to be described later herein.

The chignons 12 and 12' are well cooled because they extend radially outside the fans 8 and 9 and are less dense than those in the prior art, so that they allow more air to pass through them. They are also more compact in the axial direction. All of this is due to the features of the invention described later herein, which enables the inputs and outputs of the phases to be located in a desired way with considerable flexibility.

The fans 8 and 9 are arranged in the vicinity of the bearing plate 15 and the bearing plate 16 respectively. The bearing plates 15 and 16 are of metal, and in this example they are based on aluminium. The bearing plates include, in a known way, lugs for fastening of the alternator on a fixed part of the motor vehicle and for making electrical connection between the alternator and earth. In the known way, the bearing plates 15 and 16 are joined together, in this example by means of screws or, in another version, using stretchers, not shown, so as to constitute the above mentioned casing or support which is arranged to be mounted on a fixed part of the vehicle. This support carries the body 14 internally at its outer periphery.

The rectifying device 11, the brush carrier, and a cut-out protective cap (not given a reference numeral), which in this case is of plastics material, are carried by and fastened to the bearing plate 16, which in this case is the rear bearing, while the bearing plate 15 adjacent to the pulley 1 is the front bearing, the arrangement being such that the rear fan 9 is more powerful than the front fan 8.

The bearing plates 15 and 16 are hollow in form and each of them comprises a radial plate portion, oriented generally transversely and having a central housing for mounting a ball bearing 17 or 18 to support the rotating front and rear ends of the shaft 2, which extends through the bearings to carry the pulley 1 and the slip rings of the collector 3.

Each radial plate portion is extended at its outer periphery by a generally axially oriented peripheral portion.

The radial plate portions and the peripheral portions of the bearing plates 15 and 16 comprise, respectively, air input and output ports for the internal ventilation of the alternator by means of the fans 8 and 9 when the rotor assembly, comprising the fans 8 and 9, rotor 4 and shaft 2, is rotated by the pulley 1, which is coupled to the engine of the motor vehicle through a transmission device, which comprises at least one drive belt in engagement with the pulley 1. This ventilation in particular cools the chignons 12 and 12' and the winding 5, as well as the coils 17 and 18, the brush carrier 10 with its voltage regulator and the rectifying device 11. In FIG. 2, the path followed by the cooling fluid, which in this example is air, through the various apertures in the bearing plates 15 and 16 and inside the machine, is indicated by arrows.

In another version, at least one of the fans is replaced by an arrangement of two fans superimposed on each other in a manner described in the document FR-A-2 741 912, enabling the windings of the stator to be cooled effectively.

In a further version, the front bearing plate 15 and rear bearing plate 16 are disposed on either side of a spacer member which carries internally the body 14 of the stator 13. This spacer member is connected to the bearing plates, for example by means of screws. As a result, the casing of the machine may comprise more than two components, according to the particular application.

In yet another version, the alternator is cooled by a coolant liquid such as the cooling water for the internal combustion engine of the motor vehicle; the rear bearing includes, for example, channels as described for instance in the document DE-A-100 19914, to which reference should be made for more details.

The stator may be mounted with the aid of damping pads of elastic material, for example an elastomer, on the casing in order to absorb vibrations and reduce noise. The same is true in FIG. 2, in which the absorbent pads with an L-shaped form are not given reference numerals.

The pads are interposed between the free ends of the axially oriented outer peripheral portion of the bearing plates and the axial ends of the body 14, in facing relationship. These pads constitute elastic damping means and act radially and axially to decouple the body 14 of the stator mechanically with respect to the casing which comprises the bearing plates 15 and 16. In another version, the elastic damping means are interposed at the level of the slots 39, between the edges of the latter and the conductive hairpins mounted in the latter, as described in the document FR-A-2 803 128. In a further version, an elastically deformable, thermally conductive resin is interposed radially between the outer periphery of the body 14 and the inner periphery of one of the bearing plates, such as the front bearing plate in the manner described in the document FR-A-2 815 191. In that case, the winding 5 of the rotor 4 may consist of a wound conductive element which is coated with a connecting layer, which may for example be of the thermosetting type, as described in the document FR-A-2 809 546. The winding 5 removes more heat, which is evacuated by the thermally conductive resin. In a modified version, the body 14 is mounted directly on the bearing plates.

In yet another version, the rotor has projecting poles around which the excitation windings are formed.

In another version, the rotor includes magnets.

In a further version, the rotor is of the hybrid type and has projecting poles and permanent magnets as described in the document WO02/054566; the permanent magnets are received in housings which are formed in the stack of laminations of the rotor. These housings are open or closed towards the outer periphery of the rotor, and are closed axially by magnetic pieces which are adapted to come into abutment against the magnets. Excitation windings are arranged in circumferential alternation with the magnets, and are wound around arms which are pressed out of the stack of laminations in order to form the projecting poles.

Figure 4:
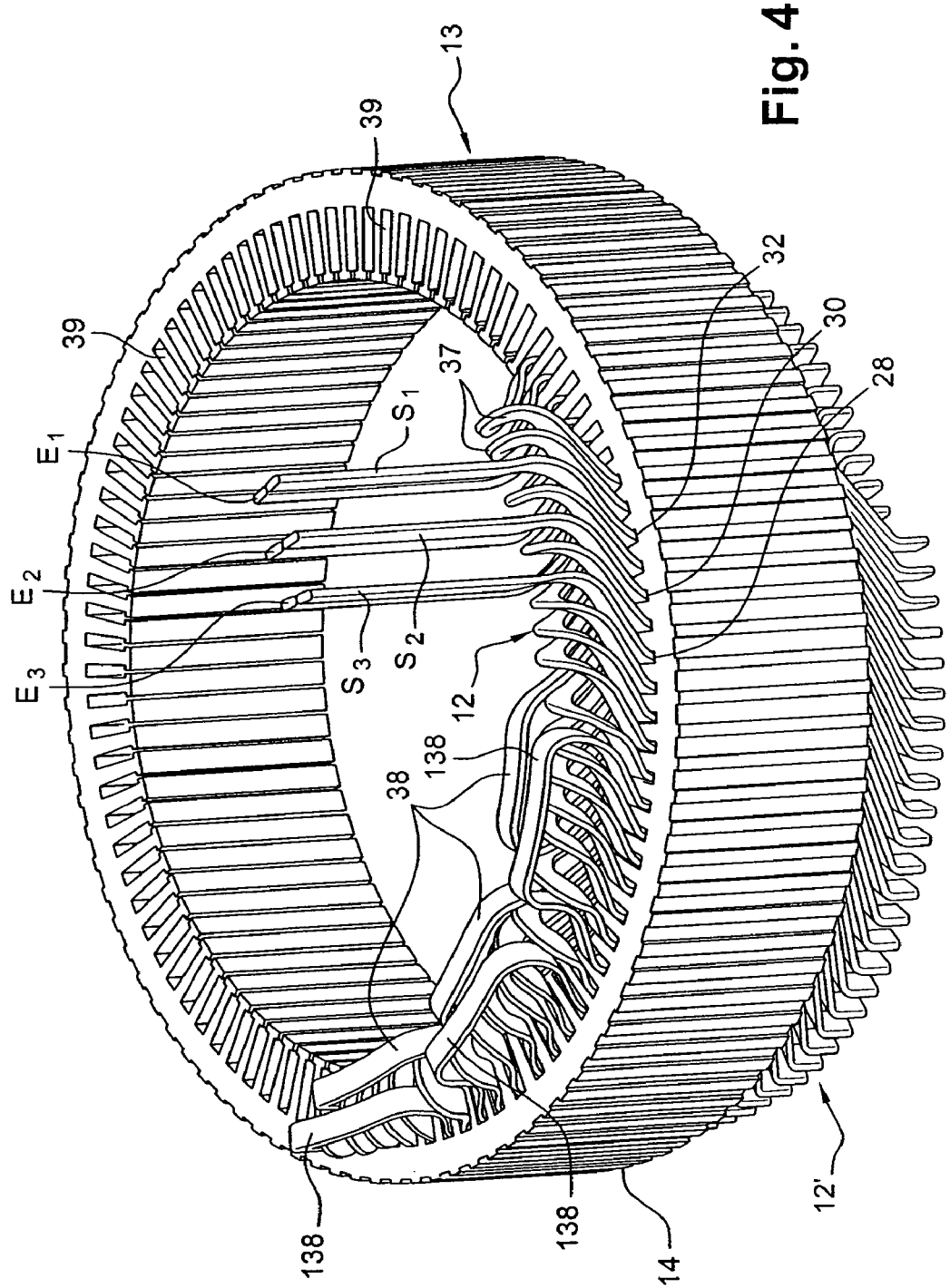
FIG. 4 is a view similar to FIG. 3, for a first example of an embodiment of the invention.
Figure 5:
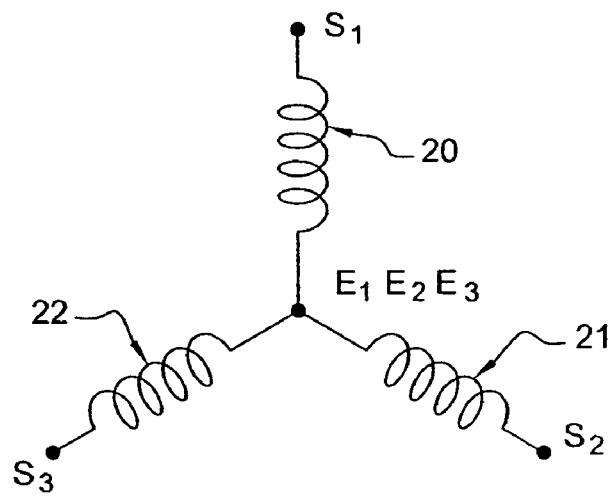
FIG. 5 is a diagrammatic view of a star connection of the phase windings of the stator.

In FIGS. 3 to 5, the alternator is of the three phase type, and has three windings, with one winding per phase. These windings are provided with electrically conductive elements as described above, in the form of bars for increasing the amount by which the slots 39 are filled, and to increase the power from the alternator.

These bars are carried by the body 14 of the polyphase stator 13, and extend through the slots 39, from one face of the body 14 to the other, each by at least one branch which is disposed within one of the slots 39 and is therefore carried by the body 14.

The bars may be of round, hexagonal, square or rectangular cross section. In this example, the bars have a rectangular cross section, with the longest sides being parallel to the side edges of the notches 39, which are of the semi-closed type. Two distinct bars of rectangular cross section are mounted within the depth of each slot 39. Thus in each slot, there are two layers of bars, namely a lower layer and an upper layer considered radially. These two bars have branches which, in cross section, have a form complementary to those of the slots 39 which is generally rectangular, so that the coefficient of filling of the slots 39 by the bars is thereby very high.

In one embodiment of the bars, which are configured to form hairpins in a manner described later herein, they are covered with an insulator so that they can be in contact in the slots through their smaller sides. The flat insulator is therefore generally U-shaped, so as to make contact with the side edges and the base of the slots. The insulator may also close at least part of the mouth of a slot, or, in another version, it may have a closed form as can be seen in FIG. 4 of the document EP-0 967 709 mentioned above. In a further version, the bars are bare, so that the insulator has a portion which constitutes a separating partition and which is inserted between the two bars as can be seen in FIG. 4 of the document EP-0 881 752 mentioned above. The insulator is then generally S-shaped, the ends of which are extended so as to come into contact with the side edges of the slots. The insulator is wound around the bars.

In yet a further version, the bars are bare on the outside and are covered with an insulator, for example an enamel, in the slots so that they are in contact with each other in the region of the slots.

All of this is possible because the invention enables a great amount of flexibility to be obtained as regards where the inputs and outputs are to be located, and it also reduces interference in the region of the chignon 12 adjacent the rear bearing plate 16 shown in FIG. 2.

Each phase winding in this example comprises at least two circumferential coils which are formed from electrically conductive bars, mounted in this case in slots 39 on the perimeter of the body 14. These bars comprise: bars 17 configured as hairpins and of a standard type, also referred to as generic hairpins, which are generally U-shaped; at least one first inversion hairpin 38, which is generally U-shaped and is initially wider in the circumferential direction than the hairpins 37; and a respective input hairpin E1 to E3 and a respective output hairpin S1 to S3, as in the document WO92/06527 mentioned above, to which reference should be made. The first inversion hairpin 38 is interposed electrically between the two coils of the phase winding.

The hairpin 38 enables the circumferential direction of the current within the phase winding to be reversed. Thus the electric current passes circumferentially, for example in the clockwise direction, through the body 14 of the stator to a branch of an inversion hairpin and then, from the other branch of this inversion hairpin, it traverses the body 14 of the stator circumferentially in the anti-clockwise direction.

The input and output portions of the phases are part of the input and output hairpins respectively, and part of the rear chignon 12 adjacent to the rear bearing plate 16, together with the heads of the hairpins 37 and 38 which are constituted by the generally U-shaped bases of these latter.

These heads are twisted, and they join the two branches of the U together.

The branches of the first inversion hairpins 38 and those of the standard type 37 are spaced apart circumferentially from each other, and in this example they are mounted in slots which are separated from each other by one pole pitch. The branches of the hairpins 37 occupy a lower and upper layer in the respective slots concerned, while the inversion hairpins 38 in this example occupy, within the slots, the lower layer of the latter. These hairpins 38 span a portion of the heads of the adjacent standard hairpins 37 of the other phases, and are therefore in the form of bridges.

The twisted heads of the inversion hairpins 38 and standard type hairpins 37 comprise two inclined arms which extend on either side of a summit portion. The inclined arms are extensions of the branches of these hairpins and are therefore arms for connection with the branches. The input and output hairpins also include a branch which is mounted in a slot and a head which is provided, in one embodiment, with at least one arm for connection to a summit portion. All of these branches are carried by the body 14, and the inversion hairpins 38 straddle the arms of the same type, that is to say the arms inclined in the same direction, as the heads of the adjacent hairpins 37 of the other phases.

The connecting arms of the inversion hairpins 38, which reverse the circumferential direction of the current in a phase winding are inclined circumferentially in the same direction, while the connecting arms of the hairpins 37 of the standard type are inclined circumferentially in the opposite direction. The same is true as regards the input and output hairpins.

In this example, the hairpins 38 have a head which includes a generally straight summit portion located above a portion of the heads of the standard type hairpins 37, which are accordingly partly straddled by the inversion hairpin. This summit portion projects axially with respect to the heads of the hairpins 37, and joins together the two connecting arms of this hairpin, which in this example are parallel to each other and inclined circumferentially in the same direction. The heads of the hairpins 37, which constitute the base portions of the U of the latter, are twisted.

The free ends of the branches of the hairpins 37 and 38, and of the special phase input and phase output hairpins, constitute the feet of those hairpins, and are part of the front chignon 12'. These free ends, projecting axially with respect to the body 14, are fixed in pairs, in this example by welding and preferably by laser beam welding.

For this purpose and in the known way, the said ends are bent circumferentially alternately in one direction and in the other, so as to bring the pairs of free ends to be welded together into a position in which one end is radially above the other, and so to form, here, a winding of the wave type. The free ends are accordingly connected in series in a repeated pattern, and each of them comprises an enclosed arm joined to the branch of this hairpin which is mounted in the slot. This arm is extended by an axially oriented terminal portion. It is these terminal portions which are fixed together, in this example by welding but in another version, for example, with the aid of an annular ring constituting an enclosure, or by any other means. The feet of the hairpins therefore have terminal junction or fastening portions.

In this way, networks are formed in the region of the chignon, so that the conductive bars are arranged in networks on either side of the body of the stator.

The outputs of the phase windings, as described above, are coupled, that is to say connected, to the device 11 for rectifying the induced electric current, having regard to the fact that the phases of the stator 13 produce an alternating current when the rotor is excited and is driven in rotation by the engine of the vehicle via the pulley 1. For this reason, it is necessary to rectify the alternating current in order to supply at least some of the direct-current power-consuming electrical devices on the vehicle, and to recharge the battery of the vehicle.

Thus, in the embodiment described, the rotary electrical machine, here in the form of an alternator for a motor vehicle, includes a polyphase armature 13 having a body 14 which carries a plurality of phases, each of which comprises, on the one hand, an input E1 to E'3 and an output S1 to S'3, each of which is part of an electrically conductive element, namely an input element and an output element, these inputs and outputs being arranged on the outside of the body 14 of the armature 13; and on the other hand, electrically conductive elements 37, 38 which in this example are in the form of bars and which are arranged on either side of the body 14 of the armature 13 so as to constitute a first chignon 12 and a second chignon 12', the bars extending through the said body. The electrically conductive elements 37 and 38 are connected together, in this example by welding, in a repeated pattern so as to constitute networks extending on either side of the body of the stator and extending through the body of the armature 13, whereby to connect the input of the phase to the output of the phase, forming a phase winding having at least two circumferential coils with at least one first electrically conductive inversion element such as a hairpin for reversing the direction of the current in a phase winding. The first inversion element is interposed electrically between the two windings, and is connected to one of the ends of the latter.

Each winding may of course comprise two elementary windings in the form of an electrically conductive element, such as a hairpin, for intermediate connection.

The first inversion hairpin comprises two branches spaced apart circumferentially from each other and connected through a head which is part of one of the chignons 12 and 12', this being referred to as the first chignon. The hairpins of the standard type also include a head which is part of the first chignon and which joins together two branches, spaced apart circumferentially with respect to each other.

These conductive elements in this example have a rectangular cross section, and are so configured as to form the standard hairpins 37 and the first inversion hairpins 38 which are generally U-shaped, or, in another version, V-shaped, together with the input hairpins E1 to E3 and the output hairpins S1 to S3. The conductive elements in this example are mounted in pairs within the slots 39, in the depth of the slot and radially in this example, in two layers, namely an inner layer and an outer layer respectively. The longitudinal sides of the bars of rectangular cross section are parallel to the side edges of the slots.

In the present case the alternator comprises a claw-type rotor with seven pairs of poles (that is to say fourteen poles in total), and a stator body having eighty-four slots 39 in each lamination. In another version of course, the rotor has six, eight, nine or ten pole pairs and the rotor comprises 72, 96, 108 or 120 slots respectively. There are accordingly six slots 39 for each pole, whereas only three slots per pole were provided in the document WO92/06527.

More precisely, between two branches separated by one pole pitch, in any one hairpin 37 (and also any one inversion hairpin 38), there are therefore five slots which are occupied by the other branches of the adjacent hairpins of the other phases. Between two branches of any one hairpin there is therefore one pitch of six slots, corresponding to one pole pair, as can be seen in FIG. 4, one of the branches of the hairpin 37, that is to say the upper branch, being disposed in the bottom of a slot 39 adjacent to the yoke of the body 14, while the other branch, that is to say the lower branch, at the level of the open side, which in this example is half closed, of another slot 39. Each slot therefore contains two layers of conductive elements, namely an outer or external layer occupied by the outer branch and an inner or internal layer occupied by the inner branch of a hairpin 37.

Figure 6:
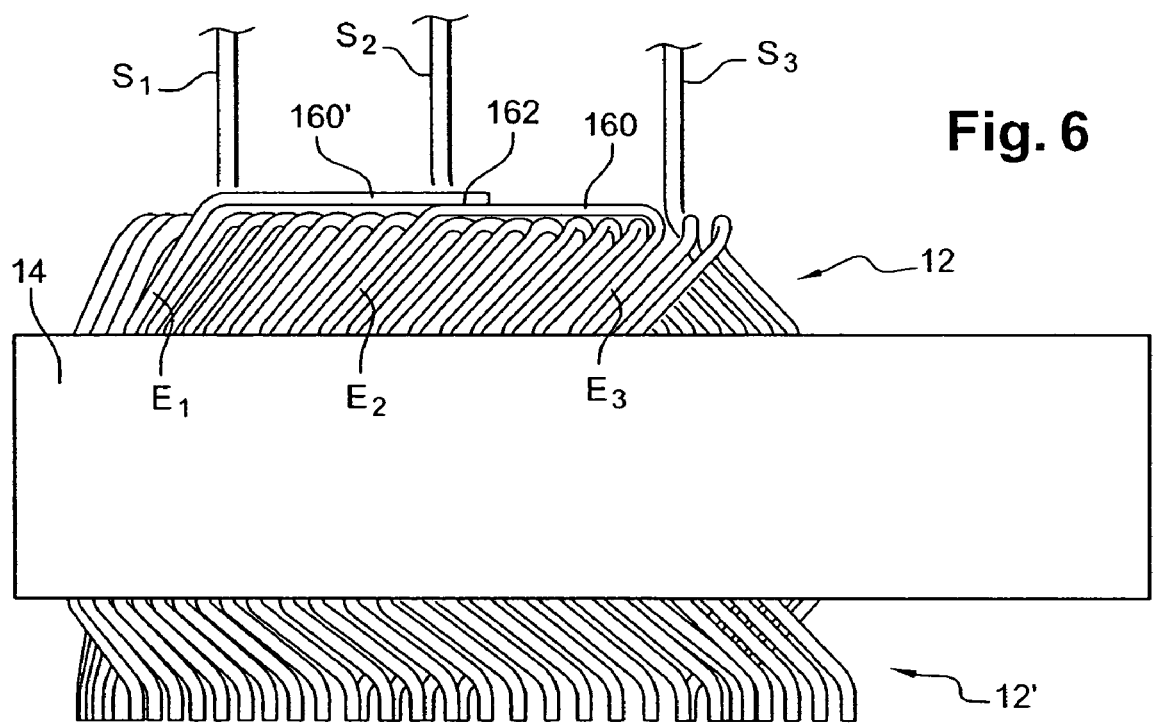
FIG. 6 is a view of part of the stator in transverse cross section, showing one embodiment of the star connection of the inputs and outputs made in the region of the chignon of the stator, in a second example of an embodiment of the invention.

In order to configure the hairpins, cylinders are used in the manner described in the document WO92/06527 (FIGS. 4 to 6). Thus, the heads of the hairpins 37 and 38 and those of the input and output hairpins are first twisted with the aid of a first cylinder, then the branches of the hairpins are introduced into the body of the stator, and finally the free ends of the hairpins are twisted with the aid of a second cylinder, in such a way as to bring the terminal portions of the free ends into relative positions in which one is above the other, before proceeding to the welding operation.

By adopting the features of the document WO92/06527, the configuration of FIG. 3 is thereby arrived at, in which the welded ends of the hairpins 37 and 38 constitute the front chignon 12', while the inputs and outputs of the phases are carried by the rear chignon 12 to be connected to the bridge 11.

A study of FIG. 2 of the said document WO92/06527 shows that the above mentioned intermediate hairpins exist.

In accordance with one feature of the invention, to fit the outputs at will, a method of making a multi-phase armature for a rotary electrical machine of the type described above, in which each phase comprises a winding having at least two coils and a first electrically conductive inversion element 38 for reversing the circumferential direction of the current in the winding, the said inversion element being interposed electrically between the two coils, is characterised in that the electrically conductive input and output elements of a common phase, referred to as the first phase, are connected together to constitute a second electrically conductive inversion element for reversing the circumferential direction of the current, and in that the electrically conductive output element of that winding is connected in the electrical circuit comprising the two coils and the two inversion elements.

As can be seen in FIG. 3, the connection between the electrically conductive input and output elements is obtained starting from an arrangement in which the electrically conductive input elements E1 to E3 and output elements S1 to S3 are adjacent (or close) to the first inversion element 38.

Thus, the free ends or terminals of the two coils are connected together through the second inversion element, and the output of the winding is inserted into the electrical circuit.

In an embodiment in which the electrically conductive elements are in the form of bars as described above, in order to avoid the problems of interference seen in FIG. 1, to fit the outputs at will and also to reduce the number of connections, such as welds, between the free ends of the hairpins, starting from an arrangement in which the input hairpins E1 to E3 and the output hairpins S1 to S3 are close (or adjacent) to a first inversion hairpin which reverses the circumferential direction in which the hairpins of the standard type are wound, one phase winding is closed back on itself by joining together the input hairpins E1 to E3 with the corresponding output hairpins S1 to S3 (see the arrows in FIG. 3), whereby to form a second inversion hairpin 138 which reverses the circumferential direction of the current in the phase winding.

In this embodiment given by way of example, this second inversion hairpin, which in this case is generally in the form of a bridge, has branches each of which occupies the same layer in the stator, namely, in this example, the outer layer or external layer, the branches of these hairpins being separated by one pole pitch. The said second hairpin 138, which is generally U shaped with an inclined head, will be called the second inversion hairpin. An output hairpin and an input hairpin are subsequently recreated by opening out a standard hairpin 37 (see FIG. 4) at a circumferential distance from the first bridge hairpins 38 and second bridge hairpins 138, which have been obtained by connecting together the input and output hairpins of FIG. 3.

The inversion hairpins 38 and 138 are distinguished from the hairpin 37 by the fact that, mechanically, the connecting branches of the heads of these hairpins 38 and 138 are inclined in the same direction finally, that is to say after they have been mounted in the body 14 and have been twisted with the aid of cylinders as in FIGS. 4 to 6 of the document WO92/06527.

Figure 14:
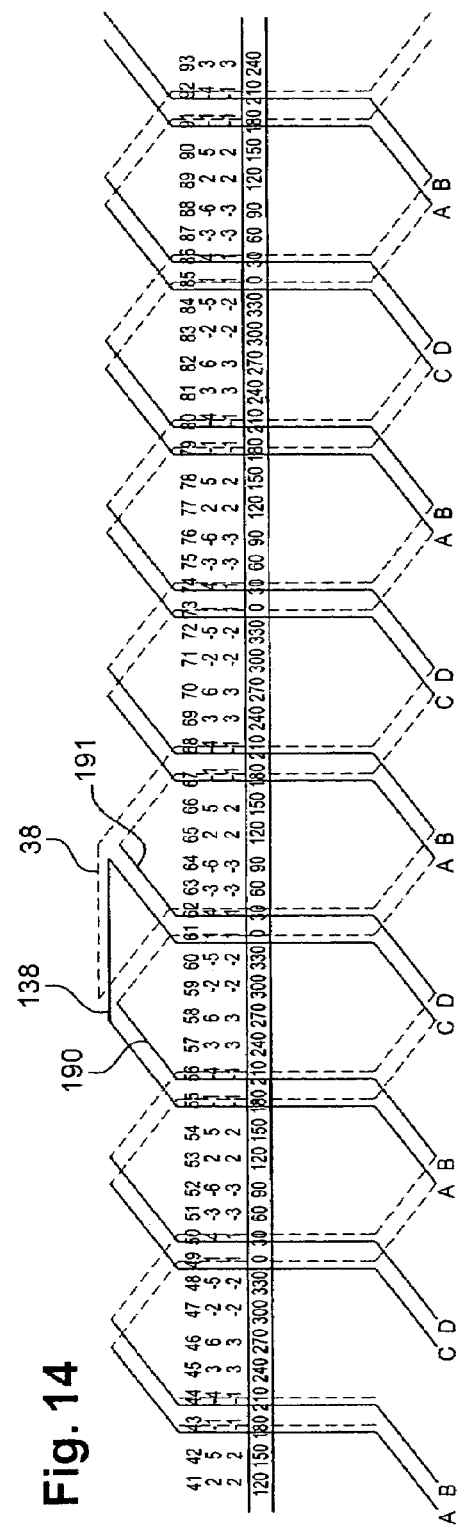
FIG. 14 is a diagram illustrating the connection of two pairs of inversion hairpins of the same type as in FIG. 4.
Figure 15:
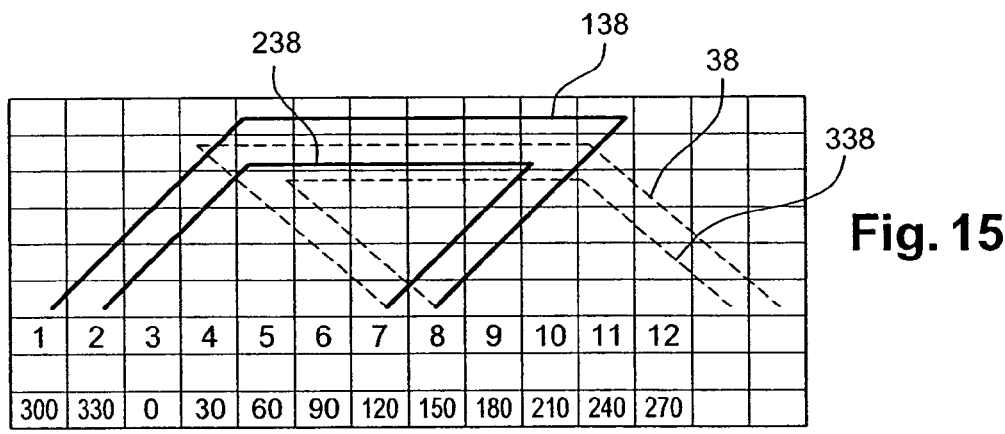
FIG. 15 is a diagram illustrating the connection of a pair of inversion hairpins of one phase, in a sixth embodiment of the invention.
Figure 16:
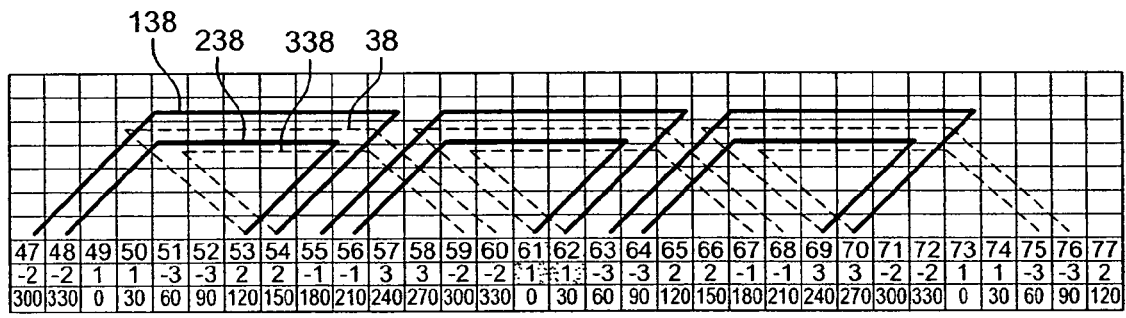
FIG. 16 is a diagram illustrating the connection of two pairs of inversion hairpins for the three phases in the sixth embodiment of the invention.

The second inversion hairpins 138 are distinguished from the first inversion hairpins 38 by the fact that the connecting arms of the second hairpins 138 are inclined circumferentially in the opposite direction to that of the connecting arms of the heads of the first hairpins 38, as is best seen in FIGS. 14 to 16. This derives from the fact that the branches of the second hairpins 138 occupy a different layer in the stator.

In FIG. 4, by opening out a hairpin of the standard type an input hairpin and an output hairpin are created at the same time, so that a hairpin of the standard type is preferably replaced by an input hairpin and an output hairpin.

In another version, this standard type hairpin can of course be replaced by an input and output hairpin in order that the input and output can be correctly located and in order that the terminal portions of these hairpins, carrying the input and output respectively, can be given the desired form and length.

The second inversion hairpins 138 have a form similar to the first hairpins 38, in this example in the form of a bridge which straddles a portion of the adjacent heads of the standard type hairpins 37 in the other phases, there being five of these heads in this case like the first hairpins 38, which are preferably located above the second hairpins 138. The second hairpins 138 have a head formed with a generally straight summit portion located above a portion of the said adjacent heads of the standard hairpins 37.

This summit portion projects axially with respect to the hairpins 37 and joins together the parallel and inclined arms in the same direction as the head of that hairpin.

The inversion hairpins 38 and 138 are, in a modified embodiment, stripped bare on the outside of the body 14, that is to say in the region of the chignon 12, and preferably also in the region of the chignon 12'.

As with the stripped hairpins 37, these hairpins 38 and 138 may be coated with an insulator in the body 14, or they may be mounted in a slot insulator which provides separation between the two branches of the hairpins mounted in the slot concerned.

The same is true for the input and output hairpins in FIGS. 4, 5, 8, 9, 10 to 13, and 17 to 20.

The phase windings may therefore be bare in the region of the chignons 12 and 12', due to the fact that the specific hairpins are well spaced apart. This helps cooling of the machine.

A polyphase armature is therefore characterised in that at least one phase winding includes at least one electrically conductive inversion element 138, such as a second inversion hairpin, for reversing the circumferential direction of the current in the winding of one phase.

The electrically conductive output element is connected in the electrical circuit which includes the two windings and the two electrically conductive inversion elements.

Preferably, this hairpin is located in the vicinity of the first inversion hairpin 38, on a circumference the diameter of which is different from that of the said first inversion hairpin 38.

Preferably, in order to reduce the local concentration of specific hairpins, the inputs and outputs of a phase are located circumferentially spaced away from the first inversion hairpin 38 and second inversion hairpin 138.

These features enable interference between the various bars to be limited further, and also enable at least the outputs to be located wherever may be desired, and enable ventilation of the chignons to be further assisted.

In this embodiment, the branches of the phase input and output hairpins are positioned in notches which are separated by one pole pitch, due to the fact that in FIG. 4, a standard hairpin is opened up or replaced. After the twisting operation, the axially oriented summit portions of the heads of the input and output hairpins are parallel, as can be seen in FIG. 4.

The inversion hairpins 38 and 138 are offset circumferentially. More precisely, the chignon 12, or so-called first chignon, has at least three local pairs of hairpin heads, each of which consists of a first head of the first inversion hairpin and a head of a second inversion hairpin. In the embodiment described, each pair is part of one phase. These pairs are offset circumferentially in succession.

In FIG. 14, the branches of the hairpins 38 and 138 are offset circumferentially with respect to each other, due to the fact that, from FIG. 3, an inlet is connected to an outlet. On the other hand there is circumferential straddling of the heads of the inversion hairpins 38 and 138, with a radial clearance being present between the latter due to the fact that the branches of these hairpins occupy different layers.

In FIG. 14, the branches of the second hairpin 138 occupy the upper layer in the slots 55 and 61, while the branches of the first hairpin 38 occupy the lower layer in the slots 62 and 68; in this example the body 14 has ninety-six slots, and the claw-type rotor has eight pole pairs. The connecting arms of each hairpin 38 or 138 are parallel to each other and inclined circumferentially in the same direction.

The arms of the hairpin 38 are inclined circumferentially in the opposite direction to those of the arms of the hairpin 138. The arms that join the branches in the slots 61 and 62 therefore cross over, being spaced apart radially.

The summit portions of the hairpins are generally parallel and offset circumferentially with a straddling zone.

In FIGS. 4 and 14 there are also intermediate connecting hairpins.

In FIG. 14, a first intermediate connecting hairpin 190 joins the branch of the upper layer of the slot 56 to the branch in the lower layer of the slot 61. A second intermediate connecting hairpin 191 connects the branch of the upper layer in the slot 62 to the branch of the lower layer in the slot 67.

The intermediate connecting hairpins 190 and 191 have one head, with connecting arms inclined circumferentially in opposite directions like those of the hairpin 37, but there is a pitch of five between the slots of the branches of these hairpins, there being four slots between the slots in which the branches of these hairpins 38 and 138 are housed. The intermediate connecting hairpins 190 and 191 therefore have a simpler form than those in the document WO92/06527.

In the present case, as explained above, an advantageous arrangement is adopted in which, by contrast with the document WO92/06527, the number of slots is doubled so that the inner branch of an intermediate hairpin is not in the same slot as the branch connected to the phase input. Each slot 39 therefore serves to accommodate the branches of two distinct conductive elements.

In FIG. 14, there are therefore three phases and six slots per pole and per phase.

The invention is of course applicable, in a modified version, to the configuration of FIG. 2 of the document WO92/06527.

As can be seen in FIG. 4, each phase winding includes a group of two adjacent inversion hairpins in the form of a bridge, 38 and 138, together with a plurality of circumferential coils consisting of standard type hairpins 37 connected in series.

These groups may be in any angular or circumferential position whatsoever, on condition that these groups are distributed well as a function of the slots occupied by the various phases.

These groups may be brought closer together as in FIG. 4. The inputs E1 to E3 and the outputs S1 to S3 of each phase are in this example axially parallel, so as to pass through openings in the rear bearing plate 16 and be connected in an appropriate way to the diodes of the rectifier bridge 11. The said inputs and outputs may be closer to or further away from the groups of hairpins 38 and 138.

In FIGS. 3 and 4, the first inversion hairpins 38 are located at the inner periphery of the annular body 14 of the stator, and have branches which are part of an internal layer of a slot, while the second hairpins 138 are fitted in the vicinity of the outer periphery of the body 14, and more precisely in the vicinity of the yoke of the latter above the hairpins 38, and they have branches which are part of an upper layer of an adjacent slot at the base of the latter, separated from the outer periphery of the body 14 by the said yoke.

As can be seen in FIG. 4, each hairpin 38 or 138 partly straddles the heads of five standard hairpins 37. The branches of the hairpins 138 and 38 are separated by a pitch of six slots, which, according to a feature of the invention, corresponds to a pole pitch, and the branches of these hairpins are disposed, respectively, in the base of one slot and that of another slot which is spaced away by one pole pitch and at the level of the open side of one slot and that of another slot spaced away by one pole pitch.

According to one feature, the heads of the hairpins 38 and 138 are therefore generally U-shaped, with arms for connection to the circumferentially inclined branches. These heads are offset radially so that there is a radial clearance between them.

Any contact of the hairpins 38 and 138 with the other hairpins 37 and the inputs and outputs is therefore avoided, and substantial air passages exist in the region of the chignon 12, which assists cooling of the latter and enables the performance of the rotary electrical machine to be improved. Noise is also reduced when the machine is working.

A branch of a hairpin 37 is fitted between two consecutive inputs or two consecutive outputs.

In this case (see FIG. 4), the hairpins placed in the slots 28, 30 and 32 have been opened out and replaced by the six input and output bars.

The positions of the input and output ends provided by the invention may be optimised for the purpose of obtaining a star type connection of the type shown in FIG. 5, in which the windings of the three phases carry the references 20, 21 and 22 respectively, or a delta type connection of the type shown in FIG. 10.

It will be noted that the configuration in FIG. 4 is of advantage in particular when the rectifying device 11 is located on the outside of the alternator, because in this case the input and output ends, located radially one above the other, are connected with the aid of a cable to an electronic unit containing the rectifying device, without any need to couple these inlet and outlet ends directly in the region of the chignon 12 and therefore of the stator.

The external electronic unit may include a command and control unit of the kind described in the document FR-A-2 745 444. In that case, the rectifier bridge is also a control bridge; the diodes are replaced by transistors of the MOSFET type. The machine, that is to say the alternator in this case, can therefore work in electric motor mode when electric current is passed into the phases of the stator.

Thus, in another version, the alternator is an alternator-starter, that is to say a reversible machine which is an alternator when the pulley is driven by the engine of the motor vehicle, or a starter for driving the engine of the vehicle via the pulley as described for example in the document FR-A-2 806 224 or in the document WO01/69762. In that case, one of the bearing plates 15 and 16 carries at least one sensor, for example of the magnetic type, for detecting the passage of a magnetic target carried by the rotor.

In a further version, a resolver may be used in place of the sensors and magnetic target.

The phase outputs can then be connected to the connector which is carried by the alternator and connected to the rectifying and control device through a cable. For more details, reference should be had to the said document.

The electrical machine according to the invention is a high power machine of small size, which is quiet and well cooled.

In FIG. 4 it is possible to form four circumferential turns in the body 14 of the stator, the hairpins 37 being arranged in a wavy pattern to form wavy windings.

Therefore each phase comprises a winding with four coils.

It is easy to obtain, from FIG. 4, a star type connection of the type shown in FIG. 5, by configuring, in consequence, the input ends located at the level of the mouths of the slots 39, while the output ends are located at the level of the bottom of the slots 39. Each input end therefore occupies a different layer of a particular slot, while the output ends each occupy an upper layer of the same slot.

Thus, in FIG. 6, in a second embodiment of the invention with star connection, two neutral input ends E2 and E3 are part of a generally U-shaped hairpin 160 which has a summit portion extending circumferentially between two parallel arms and inclined in the same circumferential direction as the input ends E2 and E3 respectively, the branches of which are mounted in the upper layers of two slots like the hairpins 138. The arms of these input ends E2 and E3 are disposed in succession at the periphery of the chignon 12. The third neutral input end E1 includes a branch which is mounted in an upper layer of a slot. This branch is extended by an arm which is inclined in the same direction as the arms of the hairpin 160. The inclined arm is extended in length by a summit portion 160', which is curved in the circumferential direction. This portion extends to the base of the hairpin 160, and more precisely to the summit portion of the hairpin 160, so that it can be connected to that portion through a single connecting point, which for example takes the form of a welded joint 162 made by electron beam welding, for example a laser weld.

For the other hairpins 37, a welded joint of the laser type is used, as described for example in the document WO02/069472, which enables the hairpins to avoid being stripped, given that an upper branch of one hairpin is welded to a lower branch of a consecutive hairpin separated from it by one pole pitch.

The welded joint is therefore made, with reference to the rectangular cross section of the hairpin 160, at the level of the length of the summit portion of this hairpin. It is thus possible to connect the neutral point with a single weld which joins together only two specific conductors, thereby increasing the reliability of the electrical connection. It is found that the summit portion 160' of the hairpin having the input end E1 is welded on the face of the summit portion of the hairpin 160 which is axially on the outside.

FIG. 6 is a partial view of the inside of the stator body, such that the output ends S1 to S3 can be seen in rear projection, the first and second inversion hairpins 38 and 138 not being visible and being offset circumferentially to avoid any interference. FIG. 6 shows the summit portion of the output ends S1 to S3. These portions are parallel to each other and extend axially. Each of these portions is connected to one branch through an inclined arm. In FIG. 6 the arms of the output ends S1 to S3 are inclined circumferentially in the opposite direction from the arms of the input hairpins E1 to E3.

Figure 7:
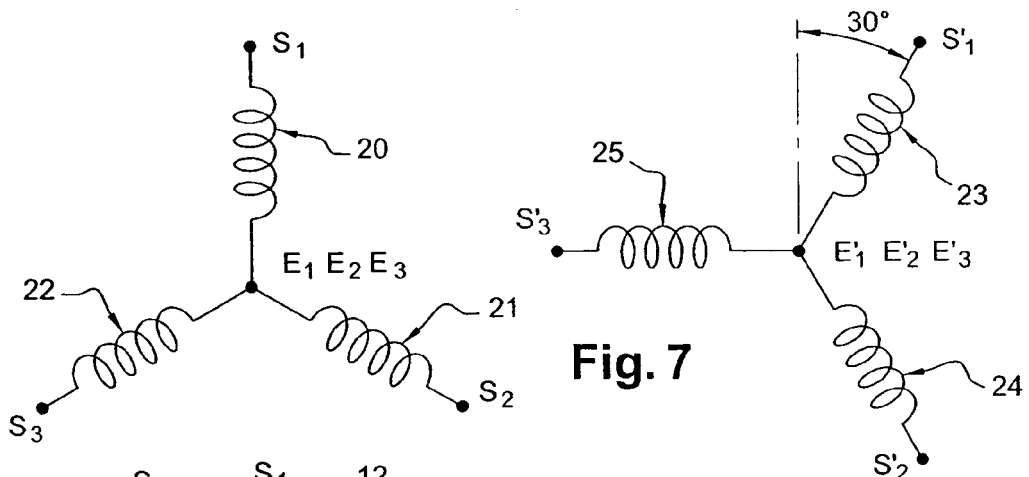
FIG. 7 is a view similar to FIG. 5, and shows a second type of connection of the windings of a stator.

In another version and as shown diagrammatically in FIG. 7, it is possible to double up the windings of each phase to form two wavy three phase windings. Each phase then comprises two coils offset by thirty electrical degrees, in the manner described for example in the document EP-A-0 454 039. In that case two diode bridges are provided as can be seen in FIG. 6 of that document, or in FIG. 1 of the document DE-A-1 563 361, to which documents reference should be made for more detail.

Each winding therefore comprises two coils in parallel, and six input bars and six output bars are provided. In another version, the windings are of the six-phase type.

More precisely, with reference to the embodiments shown in FIGS. 4 and 6, the number of first and second inversion hairpins 38, 138, and the number of input and output hairpins, are doubled up.

Thus, as will appear from FIG. 7, the alternator has, besides the phases 20 to 22 which constitute a first set of three phases, a second set of three phases 23 to 25, with, for each of these, an input end E'1 to E'3 and an output end S'1 to S'3, respectively. The output ends are connected to the rectifying device 11 as described earlier herein.

Figure 8:
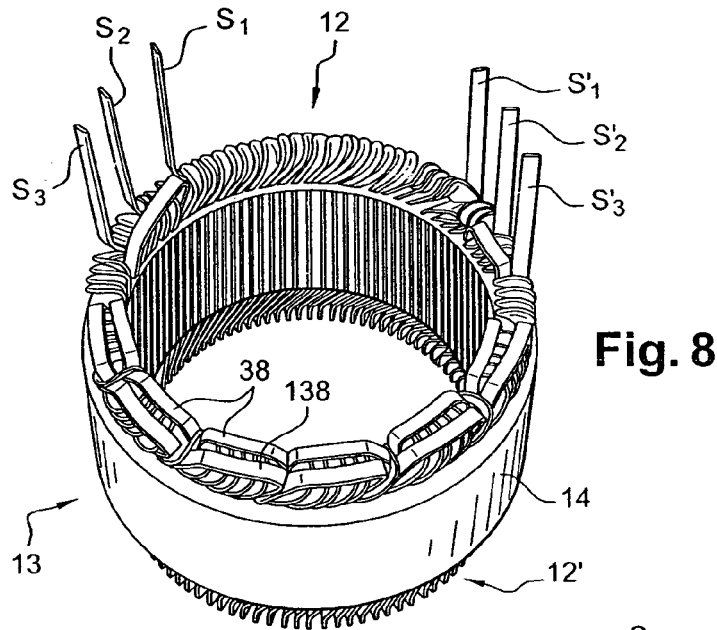
FIG. 8 is a view similar to FIG. 4 for a third embodiment of the invention, with a connection of the same type as in FIG. 7.

The output ends S1 to S3 and S'1 to S'3 are, as can be seen in FIG. 8, disposed on either side of the group of inversion hairpins 38 and 138.

The outputs E1 to E3 and E'1 to E'3 are each configured as in FIG. 6.

Figure 9:
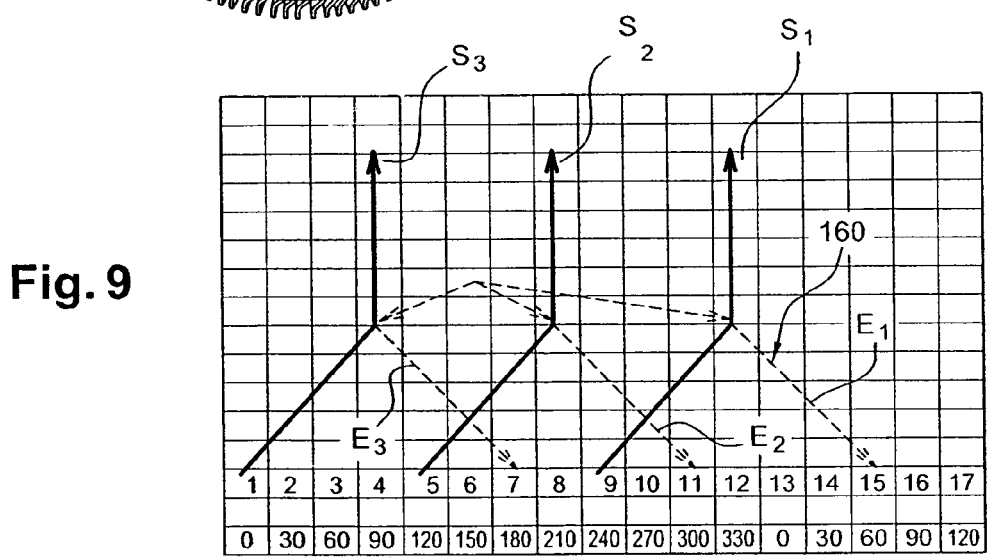
FIG. 9 is a diagram illustrating the mounting of one of the series of three outputs of FIG. 8.

FIG. 9 is a diagrammatic view of the three input ends E1 to E3 and the three output ends S1 to S3 of FIG. 6. This is of course applicable to the other input and output ends.

In the conventional way, the bars shown in full lines occupy the upper level in the slots (the bottom of the latter), while the bars shown in broken lines occupy the inner level of the slots (adjacent to the mouth of the latter). The references 1 to 17 represent the numbers of the slots and the FIG. 5 in the bottom line are the electrical angles. "Mec angle" (or angle mec) is the angle that exists between the slots concerned. This angle depends on the total number of slots 39 in the body 14 of the stator 13.

The same is true in the other FIGS. 12 to 20.

In FIG. 9, the branches of two consecutive input hairpins and two consecutive output hairpins are separated by three slots (so that the pitch is four slots). All of this does depend on the application.

The output hairpins (see FIG. 8) consist of two sets, S1 to S3 and S'1 to S'3 respectively, which are disposed on either side of the hairpins 38 and 138. The same is true for the input hairpins E1 to E3 and E'1 to E'3, adjacent to the corresponding outputs. The branches of the outputs occupy the upper layers in the slots, and the branches of the inputs occupy the lower layers of the slots. Each set of input hairpins is made as in FIG. 6.

In FIG. 9, the branches of the output ends S3 to S1 of the first set occupy the slots 9, 5, 1, while the branches of the corresponding inputs occupy the slots 15, 11 and 7.

For the second output and input series, the outputs form the upper layers in the slots 34, 38 and 42, while the inputs form the lower layers in the slots 40, 44 and 48.

In these Figures, each of the output hairpins includes a head having an axially oriented summit portion joined through a connecting arm, inclined circumferentially, to the branch of that output which is mounted in a slot 39.

The arms of the inputs are inclined circumferentially in the opposite direction to the output arms.

This does of course depend on the application of the position, variable according to the invention, of the input and output ends with respect to the bridge hairpins 38 and 138. This again depends on the number of slots 39 in the stator body, which in this example is at least equal to seventy-two, the claw-type rotor having at least twelve poles. For sixteen poles, the number of slots is ninety-six.

In a modified version, the phase windings are connected in delta configuration as shown in FIGS. 10 to 12, with each winding comprising a plurality of coils connected through the hairpins 138 in the same way as in the foregoing Figures.

Three output hairpins S1 to S3 and three input hairpins E1 to E3 are provided.

The inputs and outputs are grouped in pairs.

More precisely (see FIG. 12), the upper layers in the slots 1, 11 and 21 are occupied respectively by the input branch E3, the input branch E2 and the output branch S3, respectively.

The lower layers in the slots 7, 17 and 27 are occupied by the input branch E1, the output branch S2 and the output branch S1, respectively.

The delta connection is obtained by assembling (fixing), on the outside of the body 14, the hairpins of the slots 1, 27 (E3 and S1), with 11 and 21 (E2 and S3), and 7 and 17 (E1 and S2).

This is achieved by a simple bending operation without any interference with the hairpins.

The summit portions of the heads of the inputs and outputs are therefore oriented axially and are fixed in pairs as mentioned above, preferably by welding.

Each input and output hairpin has a circumferentially inclined arm for connection with the appropriate branch of the hairpin. The arms of the inputs are inclined circumferentially in the opposite direction from those of the output arms. The input arms E1 and output arms S3 are connected directly to the summit portions of these hairpins.

In the other hairpins, the arms are connected to the summit portions of the appropriate output and input hairpins through a second arm with a different inclination.

A more compact arrangement can be obtained (see FIG. 13) by making use of the hairpins in the upper layers of the slots 1, 3 and 5 and the hairpins in the lower layers of the slots 7, 9 and 11 respectively. The hairpins in the slots 7, 9–1, 11–3, 5 respectively are assembled (fixed) as shown in FIG. 12, with the length of the second arms being reduced. All the slots with odd numbers from 1 to 11 are occupied by one of the branches of the input and output hairpins, while the even slots are not occupied by the branches of these hairpins. Each phase can of course include two independent paths, in parallel with one pole pitch of six slots, with each phase comprising two pairs of inversion hairpins.

The number of inputs and outputs is doubled up.

Each path comprises for example two inversion hairpins 38, 138, so that there are in total four inversion hairpins per phase. FIG. 15 shows the slots occupied by the inversion hairpins of one phase. These hairpins are grouped in pairs 138, 238-38, 338.

Each pair comprises a wide hairpin 138, 38 (six slots between the branches) surrounding a hairpin 238, 338 of reduced pitch (i.e. four slots between the branches). For example, the hairpin 138 has branches which are laid in the slots 1 and 8, while the hairpin 238 has branches laid in the slots 2 and 7. The branches of the pair of second inversion hairpins 138, 238 occupy the upper layer in the appropriate slots, while the branches of the pair of first inversion hairpins occupy the lower layer of the appropriate slots. The connecting arms of the pairs of inversion hairpins 38, 238 and 38, 338 are inclined circumferentially in opposite directions. The slots 7 and 8 serve for mounting one of the branches of a wide hairpin and one of the branches of reduced pitch, 38, 238 and 138, 338 respectively. Air can easily circulate.

The hairpins 238, 338 replace the intermediate hairpins of FIG. 14.

These groups can take any angular position whatsoever, on condition that they are well distributed. FIG. 16 shows one of the solutions for these six phases, with the number of slots in the stator body being for example ninety-six. Reference should be made to the Figure for the positions of the various slots.

Figure 13:
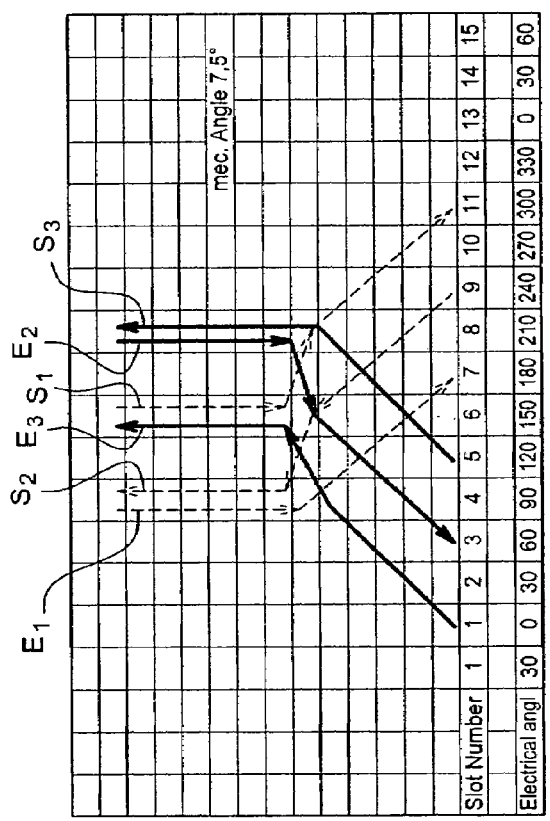
FIG. 13 is a view similar to FIG. 9, for a fifth embodiment of the invention.
Figure 17:
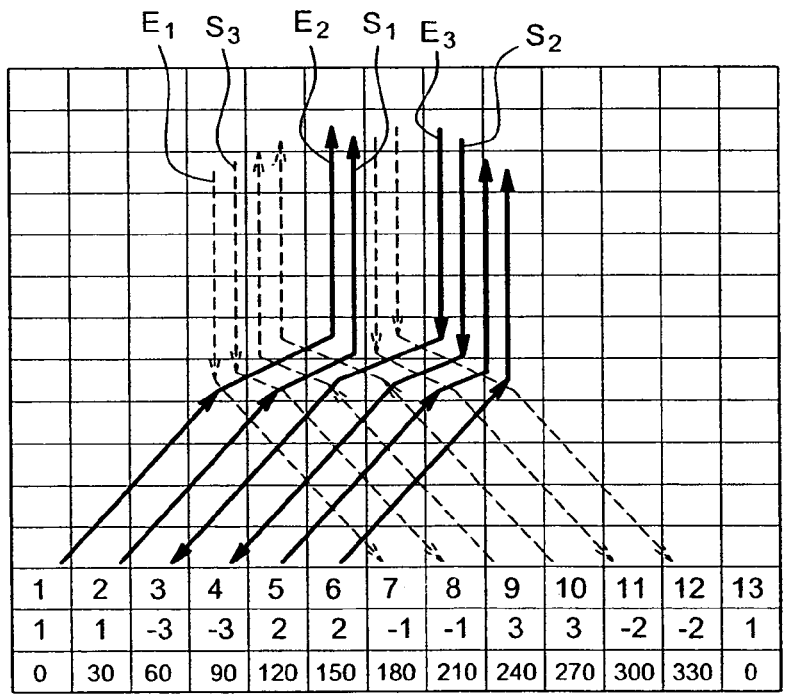
FIG. 17 is a view similar to FIG. 13 for a seventh embodiment of the invention.

FIG. 17, which is analogous to FIG. 13, shows a compact solution for the position of pairs of input hairpins and pairs of output hairpins with a delta connection of the inputs and outputs. Reference should be made to the Figure for the positions of the various slots. The input pair E1 is associated with the output pair S3, while the input pairs E2 and E3 are associated with the output pairs S1 and S2 respectively. All of the slots 1 to 12 are occupied partly by one of the branches of the input and output hairpins.

Figure 18:
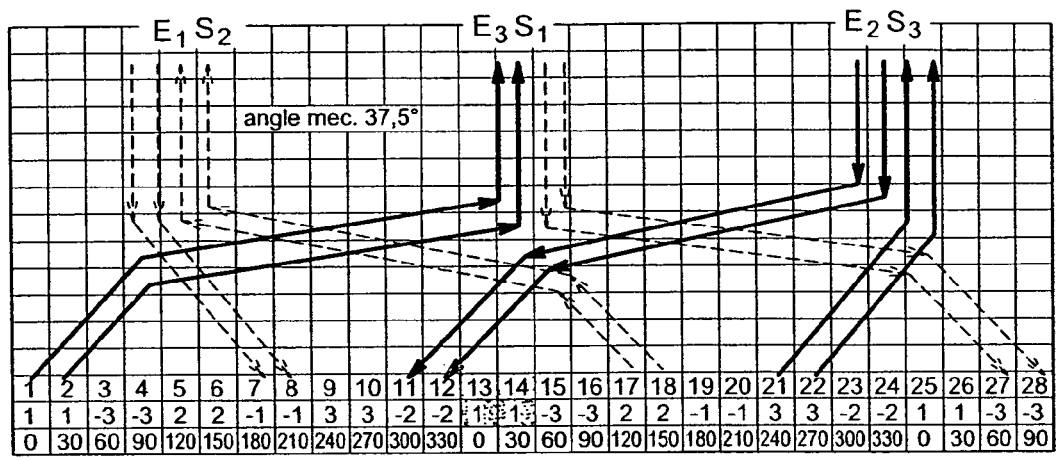
FIG. 18 is a view similar to FIG. 9, for an eighth embodiment of the invention.

FIG. 18, which is analogous to FIG. 12, shows another, though less compact, solution for the position of the input pairs and output pairs, with a delta connection of the inputs and outputs. In this Figure there is an offset of ten slots (see the Figure) between, for example, the branches of the pairs E3, S1 and E2, S3.

With ninety-six slots (that is to say with a claw-type rotor having eight pole pairs), the offset corresponds mechanically to an angle of 37.5°, while for seventy-two slots (a claw-type rotor with six pole pairs) it corresponds to an offset of 50° electrical. For the position of the inputs and outputs in the slots, reference should be made to FIG. 18, given that in this case, there is coupling of the pairs E1 S2, E3, S3 and E2 S3.

Figure 19:
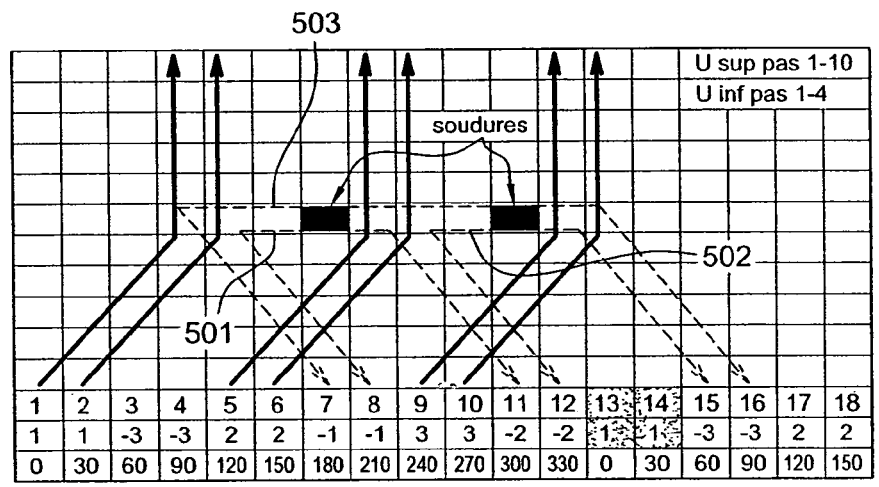
FIGS. 19 and 20 are views similar to FIG. 18 respectively, and show a ninth embodiment and a tenth embodiment of the invention.
Figure 20:
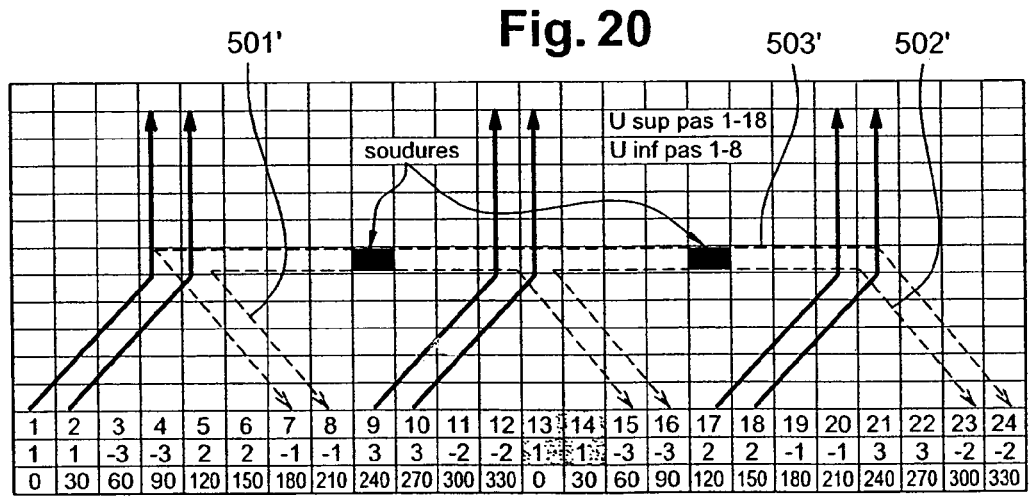

The inputs and outputs may be star connected, as can be seen in FIGS. 19 and 20 which are analogous to FIGS. 17 and 18.

In the compact solution of FIG. 19, the output hairpins are grouped in pairs which occupy the upper layers of two successive slots. The output pairs are offset by four slots (slots 1, 5–2, 6–9, 10), which corresponds to a mechanical angle of 20° and 15° respectively for a stator having seventy-two slots (the claw-type rotor having six pole pairs), and a stator with ninety-six slots (the claw-type rotor having eight pole pairs).

The neutral point of the delta connection is composed of two hairpins 501, 502 which are U-shaped, and each of which has branches spaced apart by a pitch of four slots (slots 8, 11 and 12, 15). These hairpins are surrounded by the third hairpin 503 of a pitch of ten slots between its two branches (slots 7 and 16). In this example, these hairpins occupy the lower layers of the slots 7, 8, 11, 12, 15 and 16, while the outputs occupy the upper layers of the slots 1, 2, 5, 6, 9 and 10. The heads of the hairpins 501 to 503 each have a generally straight summit portion which is joined through two connecting arms to the branches of these hairpins. The arms are inclined circumferentially in the same direction and are generally parallel to each other.

A third hairpin 503 is welded through its summit portion to each of the neutral point hairpins 501 and 502, as can be seen in FIG. 19. There are therefore two welded joints.

In the arrangement shown in FIG. 20, the pitch is increased in order to give a better passage for air. The pitch of the third hairpin 503' in this example is eighteen (i.e. the slots 7 to 24), while the pitch of the hairpins 501' and 502' is eight (slots 8, 15 and 16, 23).

The invention enables the slots to be well filled, especially where the bars are of rectangular cross section.

The size of the chignons, particularly in the axial direction, is reduced, and this enables the resistance of the windings, and therefore the number of coils in the stator, to be reduced.

The chignons are less dense, due in particular to the reduction of interference, which thus enables air to circulate more effectively, and gives better cooling of the machine.

More progressive distribution of the bars in the slots is obtained, and this enables the wave propagation and magnetic noise of the machine to be reduced.

The output of the machine is improved.

The invention is relevant to a large number of identical hairpins, for example, on the one hand, the hairpins 37, and on the other hand, the hairpins 38 and 138 occupying different layers in the slots and, in FIG. 4, covering five slots or six teeth of the stator body. The branches of these hairpins occupy for example, taking as starting point the slot 1 for one of the latter, the slots 1 and 7, being separated by five slots.

Fitting of the hairpins is made more simple.

The alternator works for example at 14V or 42V.

The electrical machine according to the invention is a high power machine of small size, which is quiet, well cooled and easy to make.

Its cost is reduced.

In another version, at least some of the U-shaped hairpins may of course consist of two half hairpins joined together, for example by welding, to constitute a U shape.

In another version, the slots 39 are of the closed type as in the document U.S. Pat. No. 1,826,295, which discloses a type of slot insulator with separating partitions and bare hairpins which can be used within the scope of this invention, or of the open type.

The axial position of the circumferentially orientated summit portions of the inversion hairpins, in relation to the summit portions of the hairpins 37 and the body 14, varies according to the application.

Similarly, the axial position of the circumferentially oriented summit portions of the first inversion hairpins, as compared with the summit portions of the second inversion hairpins, varies according to the application. These summit portions may be in a common transverse plane, or they may be in planes which are offset axially from each other.

Similarly, the circumferential offset between the summit portions of the first and second inversion hairpins depends on the application, and in particular on the number of slots in the stator body.

The rotor of the machine is not necessarily a claw-type rotor. In other versions it may be a salient pole motor and/or a rotor with permanent magnets.

It is possible to reverse the structures of the chignons. For example, the outputs, and the phase inputs and inversion hairpins have, in another version, heads which are part of the front chignon 12', while the free ends of these hairpins are part of the chignon 12. In that case, the front bearing plate 15 is so configured as for example to carry a first connector for connection with the input and/or output ends. This first connector is connected for example through electrical cables to a second connector which is part of an electronic unit which includes the rectifying device. The heads of the hairpins 37 can of course be part of the first chignon, with the heads of the inversion hairpins being part of the other chignon.

In other modified versions, the alternator is without brushes and slip rings, as is illustrated for example in the document U.S. Pat. No. 2,928,963, in which a connector of the above mentioned type carried by the front bearing plate can be seen.

The slots 39, in a further version, are inclined with respect to the radial direction and accordingly define radially inclined axial grooves. In a modification, these grooves are of helical form.

In yet another version, and as described in the document U.S. Pat. No. 5,097,167, the stator body, constituting the armature, does not have any slots, the latter being attached by being fastened inside the body of the stator. In the said document, the branches of the hairpins are placed in pairs, one above the other, to form an inner radial layer and an outer radial layer, within the central opening of the body, and are radially insulated from each other by an insulating partition, and are fixed to the body by means of an electrically insulating resin which leaves stripped portions exposed in the region of the chignons. It is the said resin that enables closed slots, applied in the central opening of the body of the armature, to be formed.

In another version, the rotor of the rotary electrical machine does not have an excitation winding, and it has a number of teeth, and therefore slots, smaller than that of the stator.

It is of course possible to reverse the structures so that, a further version, the armature according to the invention consists of the rotor of the machine. For example, the machine is, in one version, a three-phase or six-phase alternator for supplying power to the windings of an electromagnetic retarder for a motor vehicle, as described in the document EP-A-0 331 559. The armature, which consists of the rotor of the alternator, is then replaced by the armature according to the invention, while the inductor is constituted by the stator.

In one version the inputs are located in one of the chignons, while the outputs are located in the other chignon. For example, in one version, the inputs are part of the chignon 12' and the outputs part of the chignon 12.

All this is due to the features of the invention, which give great flexibility of layout and also simplify the intermediate hairpins.

In all cases, at least one of the phase windings comprises an electrical circuit which includes at least one first electrically conductive terminal element which is part of a first coil, a second electrically conductive terminal element which is part of a second coil, a first electrically conductive inversion element for reversing the direction of the current, of the type described above and interposed electrically between the two coils, that is to say between the other ends of the coils, and a second electrically conductive element of the type described above.

The said second inversion element electrically connects the two electrically conductive terminal elements together.

The inputs and/or the outputs are situated in the circuit at appropriate positions. For example, a hairpin of the standard type can be opened up, and/or the latter can be replaced so as to create a hairpin carrying the output.

The invention claimed is:

1. A polyphase armature (13) for a rotary electrical machine, comprising a body (14) carrying a plurality of phases (20 to 25), each of which comprises, firstly, an input (E1 to E'3) and an output (S1 to S'3), each of which is part of an electrically conductive input element and output element respectively, and, secondly, electrically conductive elements (37) for connecting the input of a phase to the output of a phase and constituting a winding having at least two coils per phase, together with at least one first electrically conductive inversion element (38, 338) for reversing the circumferential direction of the current in the winding, the said first inversion element being interposed electrically between the two coils, and at least one phase winding is provided with at least one electrically conductive second inversion element (138, 238) for reversing the circumferential direction of the current in the said phase winding, wherein the electrically conductive output element of the said winding is connected in the electrical circuit that includes the two coils and the two electrically conductive inversion elements, wherein the electrically conductive elements consist of electrically conductive bars (37, 38, 138, 238, 338), which are arranged on either side of the body (14) of the armature (13) so as to constitute a first chignon (12) and a second chignon (12'), and which extend through said body (14), in that the electrically conductive bars (37, 38, 338) comprise bars made in the form of standard hairpins (37), which are joined together so as to connect the input of one phase with the output of one phase to form the winding having at least two coils per phase, and wherein each of the standard hairpins (37) comprises, firstly, at least two branches spaced apart circumferentially from each other and carried by the body (14) of the armature (13), and, secondly, a head which joins together the two branches of the hairpin concerned and which is part of one of the chignons (12, 12'), and wherein the first and the second electrically conductive inversion elements consist of bars made in the form of hairpins, each of which comprises, firstly, at least two branches spaced apart circumferentially from each other and carried by the body (14) of the armature (13), and, secondly, a head which joins together the two branches of the hairpin concerned and which is part of one of the chignons (12, 12'), and wherein each of the said heads including a summit portion which joins together the two connecting arms of that head, and wherein the summit portion of the first inversion hairpin (38, 338) is offset circumferentially and radially with respect to the summit portion of the second inversion hairpin (138, 238).

2. An armature according to claim 1, characterised in that the heads of the inversion hairpins are part of the same chignon (12, 12'), and in that the head of the second inversion hairpin is mounted in the vicinity of the head of the first inversion hairpin (38, 338) on a circumference having a diameter different from that of the first inversion hairpin, whereby to form a pair of inversion hairpin heads.

3. An armature according to claim 2, characterised in that the inputs (E1 to E'3) and the outputs (S1 to S'3) of the phase windings are part of the same chignon (12, 12'), and are mounted circumferentially spaced away from the heads of the first inversion hairpins (38, 338) and the second inversion hairpins (138, 238).

4. An armature according to claim 1, characterised in that the inputs (E1 to E'3) and the outputs (S1 to S'3) of the phase windings are part of different chignons (12, 12').

5. An armature according to claim 1, characterised in that each of the heads of the first inversion hairpin (38, 338) and of the second inversion hairpin (138, 238) comprises two arms for connection with the two branches of the said inversion hairpins, the said arms of the same inversion hairpin being inclined circumferentially in the same direction, and in that the connecting arms of the first inversion hairpin (38) are inclined circumferentially in the opposite direction from the connecting arms of the second inversion hairpin (138, 238).

6. An armature according to claim 5, characterised in that the heads of the first inversion hairpin (38, 338) and those of the second inversion hairpin (138, 238) are part of the same chignon (12, 12').

7. An armature according to claim 6, characterised in that the summit portion of the first inversion hairpin (38, 338) and the summit portion of the second inversion hairpin (138, 238) are generally straight and parallel to each other.

8. An armature according to claim 6, characterised in that the summit portion of the first inversion hairpin (38, 338) is of substantially the same circumferential length as the summit portion of the second inversion hairpin (138, 238).

9. An armature according to claim 5, characterised in that each summit portion of the first inversion hairpin (38, 338) and each summit portion of the second inversion hairpin (138, 238) partly straddle the heads of standard hairpins (37) of phase windings which are distinct from the phase winding to which the said inversion hairpins belong, and in that the heads of the standard hairpins (37) straddled by each summit portion are disposed circumferentially between the two connecting arms of each of the said inversion hairpins.

10. An armature according to claim 9, characterised in that each summit portion of the first inversion hairpin (38, 338) and each summit portion of the second inversion hairpin (138, 238) projects axially with respect to the heads of standard hairpins (37) which it straddles.

11. An armature according to claim 1, characterised in that the heads of the first inversion hairpins (38, 338) and those of the second inversion hairpins (138, 238) are stripped bare.

12. An armature according to claim 1, characterised in that it is of the three-phase type, and in that the first chignon (12) has at least three local pairs of hairpin heads, each of which is constituted by a first inversion hairpin (38) and a second inversion hairpin (138) belonging to one of the three phases, and further in that the said pairs are offset successively in the circumferential direction.

13. An armature according to claim 12, characterised in that it has three inputs (E1 to E3) and three outputs (S1 to S3) which are part of terminal portions of specific hairpins which project axially with respect to the pairs of hairpin heads, and in that the said terminal portions of an input and an output which are part of a common phase winding are parallel to each other and extend one above the other, so that they are grouped in pairs offset in circumferential succession.

14. An armature according to claim 12, characterised in that the outputs (S1 to S3) are part of terminal portions of specific hairpins extending in axial projection with respect to the pairs of hairpin heads, in that the inputs (E1 to E3) are offset radially with respect to the outputs (S1 to S3), and in that two inputs (E1 and E2) are part of a generally U-shaped input hairpin (160) which has two branches carried by the body (14) of the armature (13), each branch being extended in length by a connecting arm which is part of a head that includes a summit portion that extends circumferentially to connect the two arms together.

15. An armature according to claim 14, characterised in that the third input (E3) includes a branch carried by the body (14) of the armature (13), the said branch being extended in length by an inclined arm, which is itself extended in length by a summit portion curved circumferentially so as to extend as far as the summit portion of the input hairpin, whereby to be fixed to the latter.

16. An armature according to claim 12, characterised in that it has three inputs (E1 to E3) and three outputs (S1 to S3) which are part of terminal portions of specific input and output hairpins respectively, the terminal portions projecting axially with respect to the pairs of hairpin heads, and in that the said terminal portions of an input and an output which are part of a different phase winding are parallel to each other and extend one above the other, so that they are grouped in pairs offset in circumferential succession.

17. An armature according to claim 16, characterised in that each input hairpin and each output hairpin has a branch carried by the body (14) of the armature (13), in that the said branch is extended in length by at least one inclined arm for connection with the terminal portion of the said hairpin, and in that the arms of the input hairpins are inclined circumferentially in the opposite direction from the connecting arms of the output hairpins.

18. An armature according to claim 1, characterised in that the body (14) of the armature (13) carries six inputs (E1 to E'3) and six outputs (S1 to S'3) which are disposed on either side of a group of first inversion hairpins (38) and second inversion hairpins (138), and in that the inputs and the outputs consist of two sets of three inputs and three outputs disposed on either side of the group of first inversion hairpins (38) and second inversion hairpins (138).

19. An armature according to claim 1, characterised in that each phase winding includes a pair of second inversion hairpins (38, 338) and a pair of first inversion hairpins (138, 238).

20. An armature according to claim 19, characterised in that each pair comprises a hairpin with a wide head surrounding the head of the other hairpin.

21. An armature according to claim 1, characterised in that the standard hairpins (37) extend through the body (14) of the armature (13) and have a foot which is part of the second chignon (12').

22. An armature according to claim 21, characterised in that the feet are joined together and have junction portions disposed in a circumferential row.

23. An armature according to claim 1, characterised in that the body (14) of the armature (13) carries notches (39), in that the totality of electrically conductive bars have branches which extend through the body (14) of the armature (13), and in that the branches of the electrically conductive bars are grouped in pairs in each slot (39).

24. An armature according to claim 23, characterised in that the armature consists of a stator.

25. An armature according to claim 24, characterised in that the armature consists of a stator (13) for a motor vehicle alternator.

26. An armature according to claim 24, characterised in that the alternator includes a rotor having n poles, and in that the body of the stator (13) has six slots (39) per pole and per phase.

27. An armature according to claim 1, characterised in that the armature consists of a rotor.

28. An armature according to claim 27, characterised in that the armature consists of a rotor for a motor vehicle retarder.

* * * * *